United States Patent
Sridharan et al.

(10) Patent No.: US 12,232,089 B2
(45) Date of Patent: Feb. 18, 2025

(54) INTERRUPTION HANDLING FOR MULTI-SLOT UPLINK SHARED CHANNEL TRANSMISSION

(71) Applicant: QUALCOMM Incorporated, San Diego, CA (US)

(72) Inventors: Gokul Sridharan, Sunnyvale, CA (US); Hung Dinh Ly, San Diego, CA (US); Yi Huang, San Diego, CA (US); Seyedkianoush Hosseini, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 17/655,651

(22) Filed: Mar. 21, 2022

(65) Prior Publication Data

US 2022/0303986 A1    Sep. 22, 2022

Related U.S. Application Data

(60) Provisional application No. 63/164,461, filed on Mar. 22, 2021.

(51) Int. Cl.
*H04W 72/0446* (2023.01)
(52) U.S. Cl.
CPC .............. *H04W 72/0446* (2013.01)
(58) Field of Classification Search
CPC .......... H04W 72/0446; H04W 72/56
See application file for complete search history.

(56) References Cited

U.S. PATENT DOCUMENTS

| 2021/0014008 A1* | 1/2021 | Takeda ................. H04L 1/0001 |
| 2022/0210793 A1* | 6/2022 | Behravan ............. H04W 12/106 |

FOREIGN PATENT DOCUMENTS

WO    WO-2020229555 A1    11/2020

OTHER PUBLICATIONS

ZTE 3GPP TSG RAN WG1 #103-e: R1-2007743: Discussion on potential techniques for PUSCH Oct. 2020 (Year: 2020).*
International Search Report and Written Opinion—PCT/US2022/071261—ISA/EPO—Jun. 3, 2022.

(Continued)

*Primary Examiner* — Rina C Pancholi
(74) *Attorney, Agent, or Firm* — Paul M. McAdams; Harrity & Harrity, LLP

(57) ABSTRACT

Various aspects of the present disclosure generally relate to wireless communication. In some aspects, a user equipment (UE) may receive an indication of a plurality of sets of contiguous time domain resources corresponding to a plurality of segments of a multi-slot transmission occasion. The UE may identify an interruption of a multi-slot communication associated with an impacted segment of the plurality of segments. The UE may transmit at least one communication on the multi-slot transmission occasion based on at least one of: prioritization on the impacted segment, a bandwidth part switch associated with the interruption, one or more segments, of the plurality of segments, that occur after the impacted segment, or a remainder of the impacted segment. Numerous other aspects are provided.

30 Claims, 14 Drawing Sheets

(56) References Cited

OTHER PUBLICATIONS

Panasonic: "On PUSCH Enhancements for NR URLLC", 3GPP Draft, 3GPP TSG RAN WG1 Ad-Hoc Meeting 1901, R1-1900674, Panasonic NR URLLC PUSCH Enhancements, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593521, 5 Pages, Retrieved from the Internet: URL: http://www.3gpp.org/ftp/Meetings%5F3GPP%5FSYNC/RAN1/Docs/R1%2D1900674%2Ezip. [Retrieved on Jan. 20, 2019] paragraph [02. 5], section 2.5.

ZTE Corporation: "Discussion on Potential Techniques for PUSCH", 3GPP TSG RAN WG1 #103-e, 3GPP Draft, R1-2007743, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020 (Oct. 17, 2020), pp. 1-12, XP051939883, Retrieved from the Internet: URL: https://ftp.3gpp.org/tsg_ran/WG1_RL1/TSGR1_103-e/Docs/R1-2007743.zip, R1-2007743 Discussion on potential techniques for PUSCH.docx [retrieved on Oct. 17, 2020], Section 2.1.

\* cited by examiner

INTERRUPTION HANDLING FOR MULTI-SLOT UPLINK SHARED CHANNEL TRANSMISSION

CROSS-REFERENCE TO RELATED APPLICATION

This patent application claims priority to U.S. Provisional Patent Application No. 63/164,461, filed on Mar. 22, 2021, entitled "INTERRUPTION HANDLING FOR MULTI-SLOT UPLINK SHARED CHANNEL TRANSMISSION," and assigned to the assignee hereof. The disclosure of this prior application is considered part of and is incorporated by reference into this patent application in its entirety.

FIELD OF THE DISCLOSURE

Aspects of the present disclosure generally relate to wireless communication and specifically, to techniques and apparatuses for interruption handling for multi-slot uplink shared channel transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

Some wireless transmissions may span multiple slots, such as a single physical uplink shared channel (PUSCH) transmitted on two or more contiguous slots, or a single PUSCH transmitted in two or more segments, each of which occupies two or more contiguous slots. Such wireless transmissions may be transmitted on a multi-slot transmission occasion. An interruption of a transmission on a multi-slot transmission occasion may occur due to, for example, a physical uplink control channel (PUCCH) overlapping with the multi-slot transmission occasion, a single-slot PUSCH overlapping with the multi-slot transmission occasion, an uplink cancellation indication indicating to cancel at least part of the multi-slot uplink transmission, or a bandwidth part switch occurring within a span of the multi-slot uplink transmission.

SUMMARY

In some aspects, a method of wireless communication performed by a user equipment (UE) includes receiving an indication of a plurality of sets of contiguous time domain resources corresponding to a plurality of segments of a multi-slot transmission occasion. The method may include identifying an interruption of a multi-slot communication associated with an impacted segment of the plurality of segments. The method may include transmitting at least one communication on the multi-slot transmission occasion based on at least one of: prioritization on the impacted segment, a bandwidth part (BWP) switch associated with the interruption, one or more segments, of the plurality of segments, that occur after the impacted segment, or a remainder of the impacted segment.

In some aspects, a method of wireless communication performed by a base station includes transmitting, to a UE, an indication of a plurality of sets of contiguous time domain resources corresponding to a plurality of segments of a multi-slot transmission occasion. The method may include identifying an interruption of a multi-slot communication associated with an impacted segment of the plurality of segments. The method may include receiving at least one communication on the multi-slot transmission occasion in accordance with an interruption rule that indicates how to handle at least one of: prioritization on the impacted segment, a BWP switch associated with the interruption, one or more segments, of the plurality of segments, that occur after the impacted segment, or a remainder of the impacted segment.

In some aspects, a non-transitory computer-readable medium storing a set of instructions for wireless communication includes one or more instructions that, when executed by one or more processors of a UE, cause the UE to receive an indication of a plurality of sets of contiguous time domain resources corresponding to a plurality of segments of a multi-slot transmission occasion. The one or more instructions may cause the UE to identify an interruption of a multi-slot communication associated with an impacted segment of the plurality of segments. The one or more instructions may cause the UE to transmit at least one communication on the multi-slot transmission occasion based on at least one of: prioritization on the impacted segment, a BWP switch associated with the interruption, one or more segments, of the plurality of segments, that occur after the impacted segment, or a remainder of the impacted segment.

In some aspects, a non-transitory computer-readable medium storing a set of instructions for wireless communication includes one or more instructions that, when executed by one or more processors of a base station, cause the base station to: transmit, to a UE, an indication of a plurality of sets of contiguous time domain resources corresponding to a plurality of segments of a multi-slot transmission occasion. The one or more instructions may cause the base station to identify an interruption of a multi-slot communication associated with an impacted segment of the plurality of segments. The one or more instructions may cause the base station to receive at least one communication on the multi-slot transmission occasion in accordance with an interruption rule that indicates how to handle at least one of: prioritization on the impacted segment, a BW) switch associated with the interruption, one or more segments, of the plurality of segments, that occur after the impacted segment, or a remainder of the impacted segment.

In some aspects, an apparatus for wireless communication includes means for receiving an indication of a plurality of sets of contiguous time domain resources corresponding to a plurality of segments of a multi-slot transmission occasion. The apparatus may include means for identifying an interruption of a multi-slot communication associated with an impacted segment of the plurality of segments. The apparatus may include means for transmitting at least one communication on the multi-slot transmission occasion based on at least one of: prioritization on the impacted segment, a BWP switch associated with the interruption, one or more segments, of the plurality of segments, that occur after the impacted segment, or a remainder of the impacted segment.

In some aspects, an apparatus for wireless communication includes means for transmitting, to a UE, an indication of a plurality of sets of contiguous time domain resources corresponding to a plurality of segments of a multi-slot transmission occasion. The apparatus may include means for identifying an interruption of a multi-slot communication associated with an impacted segment of the plurality of segments. The apparatus may include means for receiving at least one communication on the multi-slot transmission occasion in accordance with an interruption rule that indicates how to handle at least one of: prioritization on the impacted segment, a BWP switch associated with the interruption, one or more segments, of the plurality of segments, that occur after the impacted segment, or a remainder of the impacted segment.

In some aspects, a UE for wireless communication includes at least one processor; and at least one memory communicatively coupled with the at least one processor and storing processor-readable code that, when executed by the at least one processor, is configured to cause the UE to receive an indication of a plurality of sets of contiguous time domain resources corresponding to a plurality of segments of a multi-slot transmission occasion. The code, when executed, is configured to cause the UE to identify an interruption of a multi-slot communication associated with an impacted segment of the plurality of segments. The code, when executed, is configured to cause the UE to transmit at least one communication on the multi-slot transmission occasion based on at least one of: prioritization on the impacted segment, a BWP switch associated with the interruption, one or more segments, of the plurality of segments, that occur after the impacted segment, or a remainder of the impacted segment.

In some aspects, a base station for wireless communication includes at least one processor; and at least one memory communicatively coupled with the at least one processor and storing processor-readable code that, when executed by the at least one processor, is configured to cause the base station to transmit, to a UE, an indication of a plurality of sets of contiguous time domain resources corresponding to a plurality of segments of a multi-slot transmission occasion. The code, when executed, is configured to cause the base station to identify an interruption of a multi-slot communication associated with an impacted segment of the plurality of segments. The code, when executed, is configured to cause the base station to receive at least one communication on the multi-slot transmission occasion in accordance with an interruption rule that indicates how to handle at least one of: prioritization on the impacted segment, a BWP switch associated with the interruption, one or more segments, of the plurality of segments, that occur after the impacted segment, or a remainder of the impacted segment.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
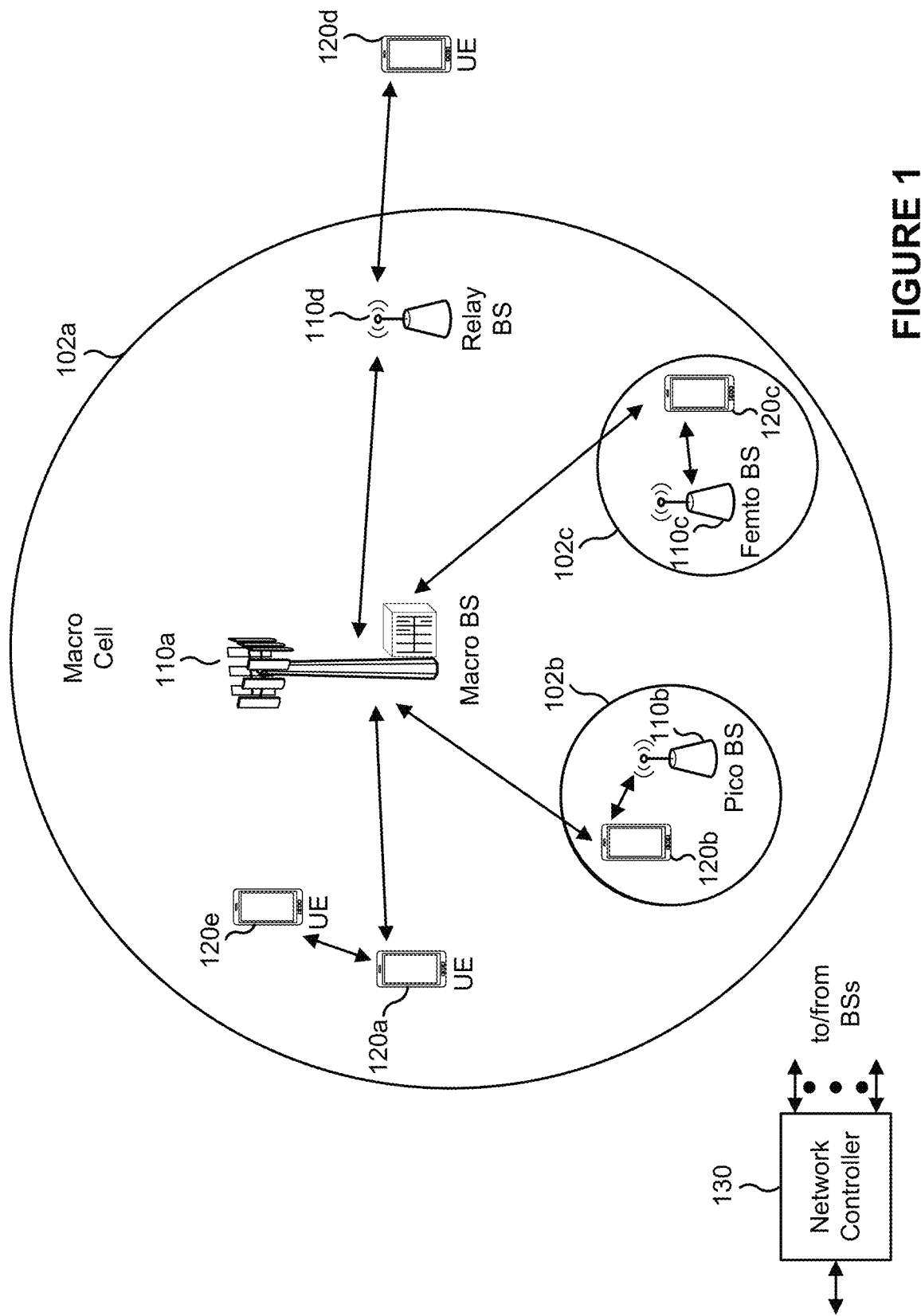
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to interruption handling for a multi-slot communication, such as a multi-slot physical uplink shared channel (PUSCH) transmission on a multi-slot transmission occasion. Some aspects more specifically relate to prioritization on an impacted segment of the multi-slot transmission occasion, handling a bandwidth part (BWP) switch associated with the interruption, handling one or more segments that occur after the impacted segment, and handling a remainder of the impacted segment. In some aspects, the above considerations may be based at least in part on an interruption rule, which indicates behavior of one or more of a UE or a base station in view of such interruptions.

Particular aspects of the subject matter described in this disclosure can be implemented to realize one or more of the following potential advantages. In some examples, the described techniques can be used to improve reliability and predictability of multi-slot communications. By improving reliability and predictability of multi-slot communications, throughput is improved and adherence to quality of service requirements associated with multi-slot communications is improved. Furthermore, by providing an interruption rule indicating behavior of the UE or the base station, explicit signaling between the UE and the base station to define the behavior is reduced, thereby decreasing overhead and increasing throughput.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, or a relay, among other examples.

UEs 120 (for example, 120*a*, 120*b*, 120*c*) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing 284 that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
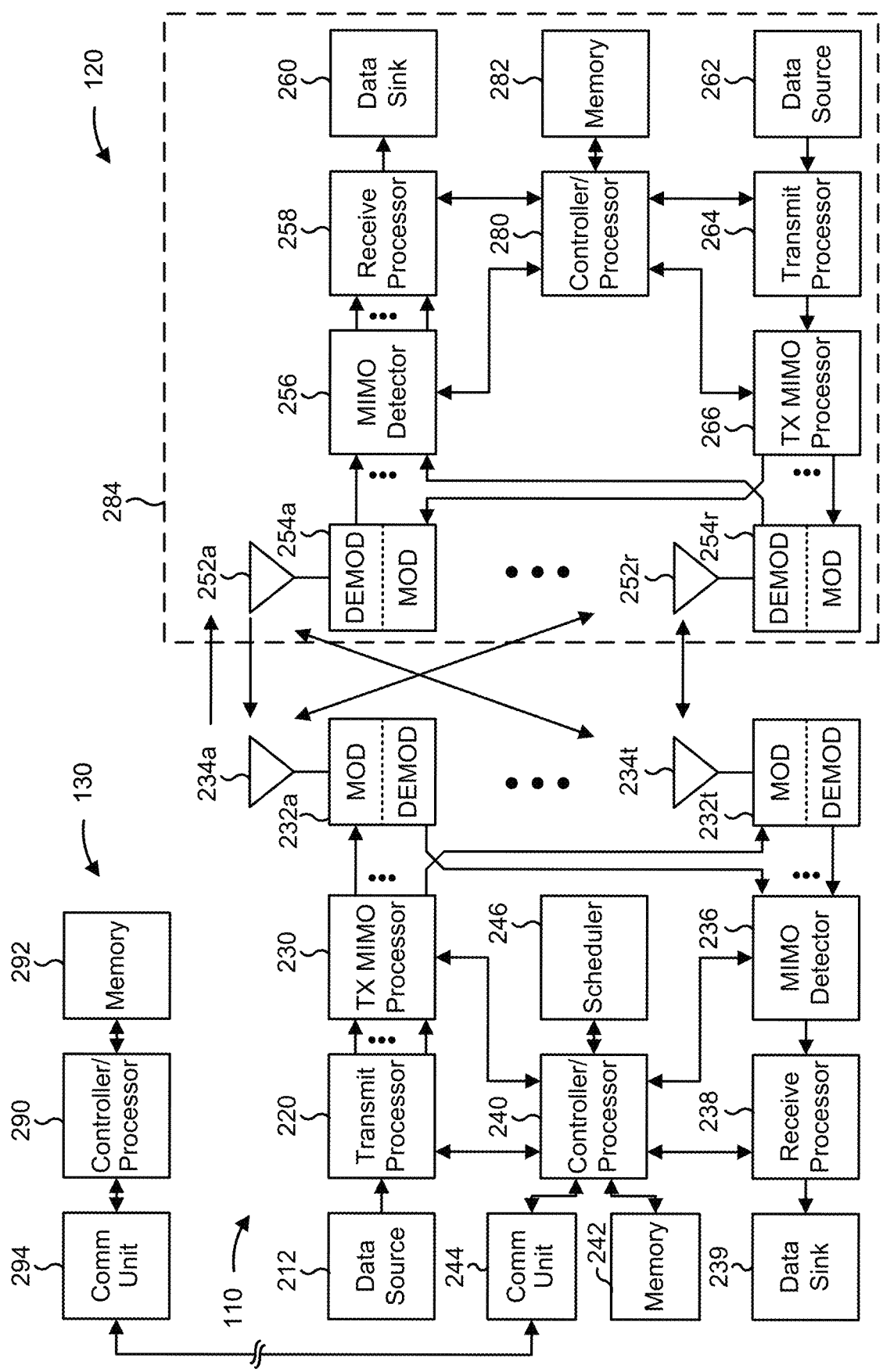
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234*a* through 234*t*, and UE 120 may be equipped with R antennas 252*a* through 252*r*, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with interruption handling for a multi-slot communication, as described in more detail elsewhere herein. For example, controller/processor 240 of base station 110, controller/processor 280 of UE 120, or any other component(s) of FIG. 2 may perform or direct operations of, for example, process 1100 of FIG. 11, process 1200 of FIG. 12, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1100 of FIG. 11, process 1200 of FIG. 12, or other processes as described herein. In some aspects, executing instructions may include running the instructions, converting the instructions, compiling the instructions, or interpreting the instructions, among other examples.

Figure 3:
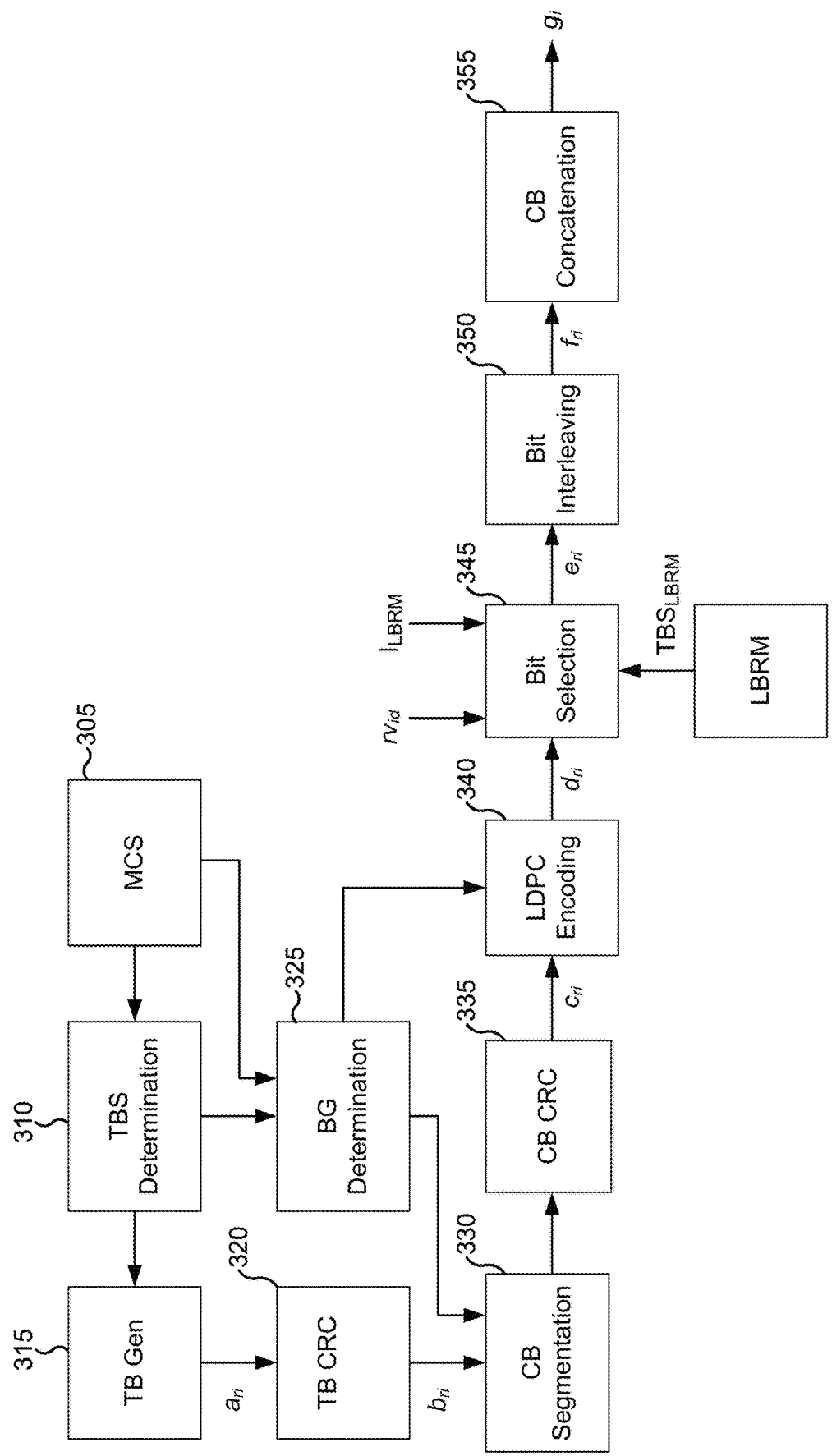
FIG. 3 is a diagram illustrating an example of an uplink transmission coding chain in accordance with the present disclosure.

FIG. 3 is a diagram illustrating an example of an uplink transmission coding chain in accordance with the present disclosure. The coding may be used for the transmission of data payloads in a wireless network, such as via a physical uplink shared channel (PUSCH) or a physical downlink shared channel (PDSCH). The operations of FIG. 3 may be performed by a transmitter, such as a UE (e.g., UE 120) or a base station (e.g., base station 110).

The coding chain may be based at least in part on a modulation and coding scheme (MCS), which is shown at 305. An MCS is an index indicating a modulation and a code rate for a communication. For example, an MCS may indicate how many bits can be transmitted per resource element. A modulation indicates a number of bits (whether parity bits or information bits) per resource element, and a code rate indicates a ratio between information bits and parity bits for encoding. Generally, the MCS is indicated via scheduling information for a given communication, such as in downlink control information (DCI).

At 310, the transmitter may determine a transport block size (TBS) based at least in part on the MCS. A TBS indicates how many bits are to be passed from the medium access control (MAC) layer to the physical layer in one instance of a uplink shared channel transmission that may span more than one slot. For example, the payload for the physical layer (such as in a PUSCH or a PDSCH) is a transport block. The transport block may include a number of bits, determined based at least in part on the MCS and a number of physical resource blocks (PRBs) to be used to transmit the transport block.

At 315, the transmitter may generate a transport block $a_{ri}$. For example, the transport block may include a number of bits indicated by the TBS of the transport block. At 320, the UE may append a cyclic redundancy check (CRC) to the transport block to form a transport block $b_{ri}$. The CRC aids in error detection. The CRC may be generated using a cyclic generator polynomial and may be appended to an end of the transport block.

At 325, the transmitter may determine a base graph (BG) for the transport block. A BG is a parameter for determining parity bits for a transmission based at least in part on a TBS and a code rate (with BG1 being intended for transport blocks with a larger TBS, and BG2 being intended for transport blocks with a smaller TBS).

At 330, the transmitter may perform codeblock (CB) segmentation for the transport block $b_{ri}$. "CB segmentation" refers to segmentation of the TB to form one or more codeblocks for channel coding and rate matching. At 335, the transmitter may append one or more CRCs to the one or more codeblocks to form codeblocks $c_{ri}$. For example, the transmitter may perform per-codeblock CRC determination and insertion, which aids in early error detection.

At 340, the transmitter may perform low density parity check (LDPC) encoding on the one or more codeblocks to form encoded bits $d_{ri}$. More generally, the transmitter may perform channel coding according to one or more parameters such as the BG determined at 320. The LDPC encoding may generate a plurality of bits that are stored in a circular buffer, as described in connection with FIG. 4. In some aspects, the encoded bits may be referred to as an encoded codeblock. The encoded codeblock $d_{ri}$ is distinct from the codeblocks $c_{ri}$.

At 345, the transmitter may perform bit selection. "Bit selection" refers to selecting coded bits (sometimes referred to as encoded bits) $e_{ri}$ (where the totality of the selected coded bits are represented by E) for interleaving and concatenation. In some cases, "bit selection" is referred to as "rate matching." As shown, the bit selection may be based at least in part on a redundancy version index ($rv_{id}$), a limited buffer rate matching (LBRM) index ($I_{LBRM}$), and an LBRM transport block size ($TBS_{LBRM}$).

The transmitter may select a number of coded bits per codeblock. There can be one or multiple different values for the number of coded bits per codeblock. Codeblocks may be aligned to RE boundaries. G may represent the actual number of bits available for transmission. C' may represent the number of codeblocks to be transmitted, wherein C' is according to a codeblock group transmission information (CBGTI) field if the CBGTI field is present in DCI, or is C (that is, all codeblocks) if the CBGTI field is not present. Bits may be selected (e.g., read) sequentially from the circular buffer. A starting position for a codeblock, $k_0$, may be determined by the RV. The number of bits read is E, excluding filler bits.

At 350, the transmitter may perform interleaving to generate one or more interleaved encoded bit sequences $f_{ri}$. In some cases, "interleaving" is referred to as "channel interleaving." In some aspects, the transmitter may perform row-column interleaving. In row-column interleaving, selected bits are arranged into a number of rows corresponding to the modulation order. Then, selected bits are read column-by-column, such that bits from each row are interleaved with each other. For redundancy version 0, the interleaver may be a systematic-bit priority interleaver, so that systematic bits are placed in higher reliability positions in a quadrature amplitude modulation (QAM) symbol. When binary phase shift keying (BPSK) is used, the interleaver may not affect the bit stream. At 355, the transmitter may perform codeblock concatenation to generate a codeblock $g_i$.

After the codeblock has been generated, the transmitter may transmit the codeblock. For example, the transmitter may perform scrambling, modulation, layer mapping, antenna port mapping, mapping to one or more virtual resource blocks, and mapping from virtual resource blocks to physical resource blocks. Then, the transmitter may transmit a communication carrying an encoded transport block, which is based at least in part on the codeblock.

A receiver may receive the communication carrying the encoded transport block over the time-frequency resources assigned for this transmission. The receiver estimates the channel using the demodulation reference signals transmitted along with the encoded bits. Using the estimated channel and the received signal, the receiver performs the demapping operation on each resource element of the received signal to obtain soft information regarding the bit values of the encoded transport block. Soft information may the form of a log-likelihood ratio (such as a probability, based on the received signal, that a transmitted bit is a 0 or a 1). This probability could be quantized to a few levels (for example, 16 or 32 levels). In the extreme case that the probability is quantized to 2 levels, the soft information degenerates to "hard" information. For example, a two-level quantization of the probability may represent the receiver's best estimation as to what the transmitted bit was, with no further nuance on this guess.

The receiver may perform de-interleaving on the soft information to obtain de-interleaved soft information. The receiver may concatenate the de-interleaved soft information to obtain concatenated soft information. The receiver may decode the concatenated soft information.

In some cases, bit selection and interleaving may be performed for communications that cross slot boundaries. A communication that crosses slot boundaries, for example, may include a multi-slot communication on a multi-slot transmission occasion, such as described in connection with FIG. 5 below. A multi-slot communication is a communication where a payload (such as a transport block) is transmitted across multiple slots (such as with repetitions of the transport block in each slot or with a first part of the transport block in a first slot and a second part of the transport block in a second slot). In some aspects, the transmitter may select bits for rate matching across an entire multi-slot transmission occasion, then may interleave and transmit the selected bits. In other aspects, the transmitter may select bits for rate matching per slot of a multi-slot transmission occasion, then may interleave on a per slot basis and may transmit the selected bits. In yet other aspects, the transmitter may select bits for rate matching across each contiguous segment of the transmission occasion, then may interleave on a per segment basis and may transmit the selected bits. Interleaving bits per slot may ensure that the UE only remembers a starting position within a circular buffer for each slot, may obviate the need to buffer rate matched bits, may be easier on the timeline of the UE, and may enable consideration of uplink control information multiplexing on a per slot basis, since the timeline need not be tied to the beginning of the multi-slot transmission. Interleaving bits per segment may ensure that the UE only needs to remember a starting position within the circular buffer for each slot, may obviate a need to buffer rate matched bits. Interleaving bits across the entire multi-slot transmission occasion may provide improved performance may be slightly better (since systematic bits occupy more reliable position).

Figure 4:
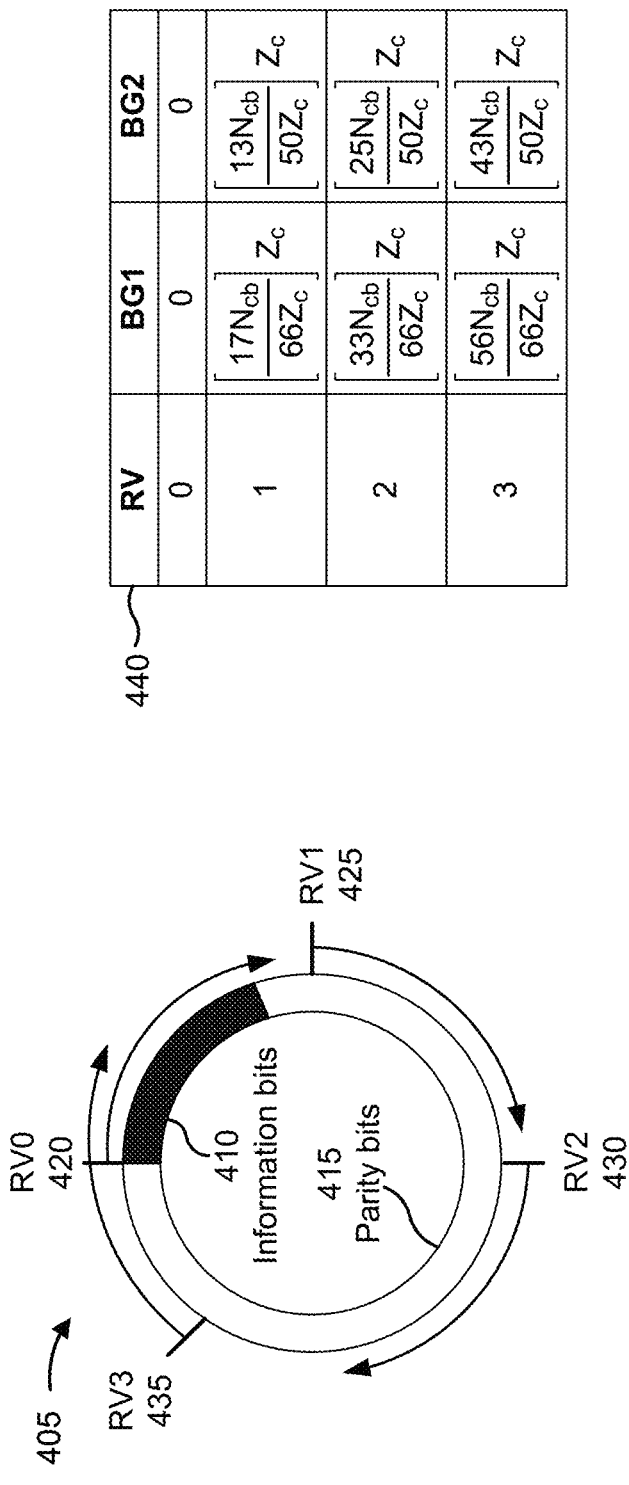
FIG. 4 is a diagram illustrating an example of redundancy version cycling based at least in part on uplink transmission occasions, in accordance with the present disclosure.

FIG. 4 is a diagram illustrating an example of redundancy version cycling based on uplink transmission occasions, in accordance with the present disclosure. A UE (such as UE 120) may apply redundancy version cycling to PUSCH repetitions to transmit different redundancy versions of the PUSCH repetition in different transmission occasions (or in different slots or different segments of a transmission occasion).

A "redundancy version" (RV) of a PUSCH repetition may be used to select a set of encoded bits that are transmitted for that PUSCH repetition. The RV may indicate a starting location in a circular buffer such as circular buffer 405. Using RV cycling, the UE transmits a different set of encoded bits in different PUSCH repetitions. For example, the UE may store bits for an uplink transmission in a circular buffer 405 (stored in memory of the UE). The circular buffer 405 stores information bits 410 (sometimes called systematic bits) and parity bits 415 (sometimes called parity-check bits). The information bits 410 may include the data to be transmitted, and the parity bits 415 may include linear combinations of the data (that is, of the information bits 410). The UE may encode information bits 410, parity bits 415, or a combination of information bits 410 and parity bits 415 into a set of encoded bits and may transmit the set of encoded bits. The particular bits that are selected to be included in the set of encoded bits for a PUSCH repetition depend on (or are defined by) the RV of that PUSCH repetition. By selecting different combinations of information bits 410 and parity bits 415, the UE improves reliability of PUSCH transmission, since not all bit positions are associated with the same level of reliability.

As an example, the starting bit locations may be defined by a table 440, such as for NR hybrid automatic repeat request (HARD) using low-density parity-check (LDPC) code. The table 440 defines starting bit locations in the circular buffer 405 for a first base graph (BG1) and a second base graph (BG2). A base graph is a parameter for determining parity bits 415 for a transmission based at least in part on a transport block (TB) size and a code rate (with BG1 being intended for TBs with a larger TB size, and BG2 being intended for TBs with a smaller TB size). Referring to the table, $N_{cb}$ represents the length of the circular buffer 405 (e.g., the number of bits included in the circular buffer 405), and $Z_c$ represents a lifting size, which is based at least in part on the number of information bits 410 and the number of BG columns corresponding to information bits 410. The table 440 is just one example, and other starting bit locations may be used in practice.

In some examples, a base station (e.g., base station 110) may transmit information, such as an RV index, to the UE. For example, the base station may transmit the RV index for a PUSCH communication in downlink control information (DCI) that schedules the PUSCH communication. The RV index may indicate a sequence of RVs to be applied to a corresponding sequence of occasions, such as a sequence of PUSCH transmission occasions, a sequence of slots, or a sequence of segments. The UE may increment a counter n (sometimes called an index n) for each occasion following (or indicated by) the DCI. The UE may use the information transmitted by the base station (the RV index) and the value of the counter n for a particular occasion to determine an RV to be applied to that occasion.

For example, as shown by table 445, for PUSCH Repetition Type A, if the base station indicates an RV index of 0, then the UE may determine an RV to be applied to an nth transmission occasion (for PUSCH Repetition Type A) by calculating n mod 4, where "mod" represents a modulo operation. If n mod 4=0 (for transmission occasion 0), then the UE applies RV0 to that transmission occasion. If n mod 4=1 (for transmission occasion 1), then the UE applies RV2 to that transmission occasion. If n mod 4=2 (for transmission occasion 2), then the UE applies RV3 to that transmission occasion. If n mod 4=3 (for transmission occasion 3), then the UE applies RV1 to that transmission occasion. As shown, the RV index may have a value of 0, 1, 2, or 3, each of which corresponds to a different sequence of RVs (e.g., a different order for RV0, RV1, RV2, and RV3).

Similarly, for PUSCH Repetition Type B, if the base station indicates an RV index of 0, then the UE 120 may determine an RV to be applied to an nth actual repetition (of PUSCH Repetition Type B) by calculating n mod 4. If n mod 4=0 (for actual repetition 0), then the UE applies RV0 to that actual repetition. If n mod 4=1 (for actual repetition 1), then the UE applies RV2 to that actual repetition. If n mod 4=2 (for actual repetition 2), then the UE applies RV3 to that actual repetitions. If n mod 4=3 (e.g., for actual repetition 3), then the UE applies RV1 to that actual repetition.

Some techniques described herein use multi-slot transmission occasions, such as multi-slot PUSCH occasions. In such examples, RVs may be assigned per PUSCH (such that a PUSCH occupying a plurality of contiguous slots on a multi-slot transmission occasion has a given RV), or per segment (such that a segment associated with a PUSCH, occupying multiple sets of contiguous slots, is associated with a given RV). In such a case, RV indexes may be incremented according to how RVs are assigned (that is, per PUSCH, per segment, or per slot, such as for each slot of a multi-slot transmission). Multi-slot transmission occasions are described in more detail below.

Figure 5:
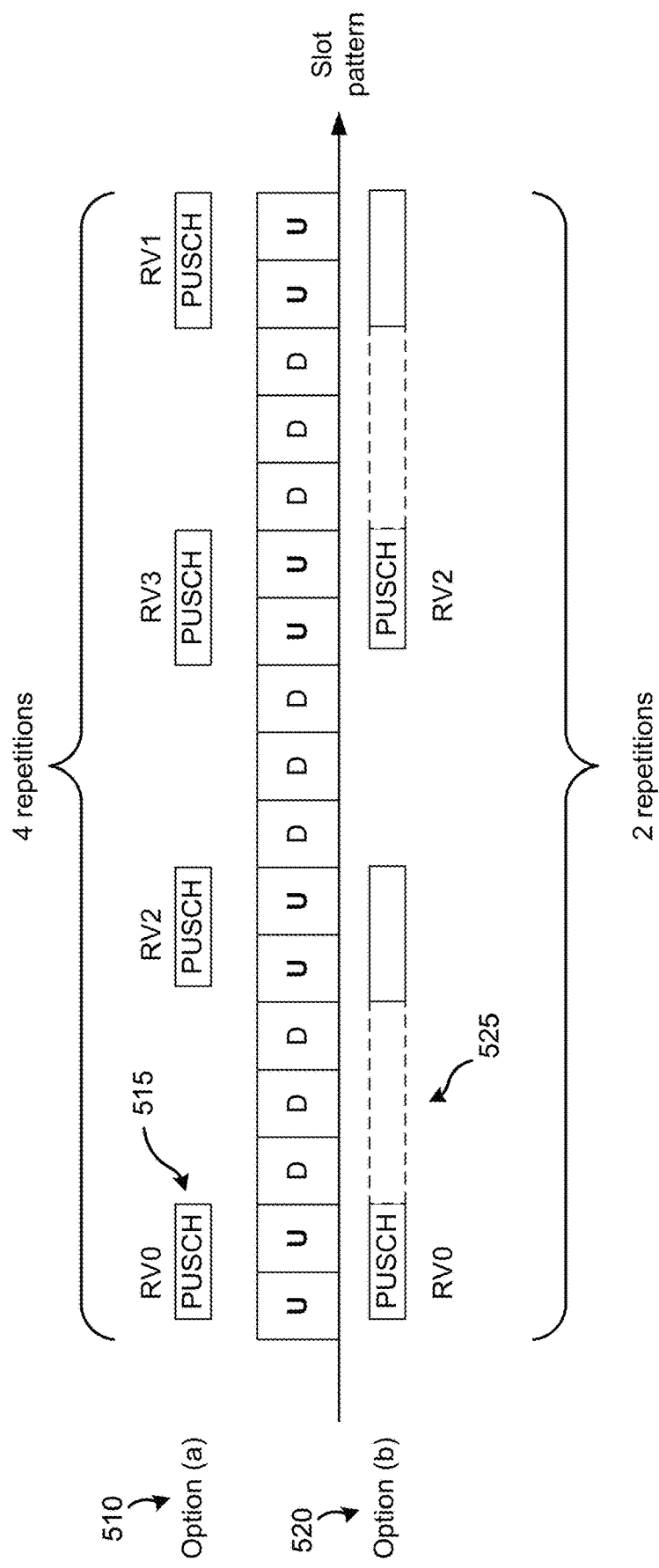
FIG. 5 is a diagram illustrating an example of multi-slot uplink shared channel transmission in accordance with the present disclosure.

FIG. 5 is a diagram illustrating an example of multi-slot uplink shared channel transmission in accordance with the present disclosure. Slots are labeled as "U," indicating an uplink slot (that is, a slot with a threshold number of configured or indicated uplink symbols), or "D," indicating a downlink slot (that is, a slot with a threshold number of configured or indicated downlink symbols). Two options are depicted for a UE to transmit PUSCH repetitions over a set of contiguous time domain resources, where the PUSCH repetitions span multiple slots and/or multiple segments, as described in further detail herein. PUSCH repetitions that span multiple slots or multiple segments may be referred to herein as multi-slot PUSCH transmissions (MSPTs). Although techniques are described herein in connection with PUSCH repetitions and MSPTs, these techniques can be applied to various types of uplink repetitions, such as an uplink data repetition, an uplink control repetition (such as physical uplink control channel (PUCCH) repetition), or the like.

A repetition, such as an uplink repetition or a downlink repetition, may be used to improve reliability, such as for ultra reliable low latency communication (URLLC) or for UEs located in a geographic area with poor channel conditions (such as a cell edge). When repetitions are used, a transmitter repeats transmission of a communication multiple times. For example, a UE may transmit an initial uplink communication and may repeat transmission of (that is, may retransmit) that uplink communication one or more times. Each repetition may include different encoded bits in accordance with different RVs, as described herein. Therefore, a receiver can attempt to combine multiple repetitions to improve the likelihood of successfully decoding a payload of the multiple repetitions.

As used herein, the term "repetition" is used to refer to the initial communication and is also used to refer to a repeated transmission of the initial communication. For example, if a UE is configured to transmit four repetitions, then the UE may transmit an initial transmission and may transmit three repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance. In these examples, a transmission occasion is a multi-slot transmission occasion, which facilitates the transmission of MSPTs.

For a first type of MSPT, shown at 510 and referred to as Option (a), each repetition and each multi-slot transmission occasion spans a set of contiguous resources (such as symbols or slots). Option (a) may enable, for example, a UE to transmit a transport block, spanning a set of contiguous slots, in a single transmission occasion. For example, for a first MSPT 515 that includes a codeblock associated with RV0, the repetition is shown spanning a set of two contiguous slots. As used herein "spanning across a set of contiguous slots" means "including at least one symbol of each slot of the set of contiguous slots."

For a second type of MSPT, shown at 520 and referred to as Option (b), each repetition spans two or more segments, and a segment includes a set of contiguous slots. Option (b) may enable, for example, a UE to transmit a transport block, spanning multiple sets of contiguous slots, in a single transmission occasion. For example, for a second MSPT 525 that includes a codeblock associated with RV0, the repetition is shown spanning two sets of contiguous slots. Thus, the repetition is transmitted on two segments of the transmission occasion, where a first segment occupies at least part of the first and second slots of the slot pattern, and a second segment occupies at least part of the sixth and seventh slots of the slot pattern.

In some aspects, RV cycling may be performed on a per slot basis. For example, each slot of a multi slot transmission occasion may be assigned a respective RV index. In some aspects, RV cycling may be performed on a per transmission occasion basis. For example, each transmission occasion may be assigned a respective RV index. In some aspects, RV cycling may be performed on a per segment basis. For example, each segment of a transmission occasion may be assigned a respective RV index.

Figure 6:
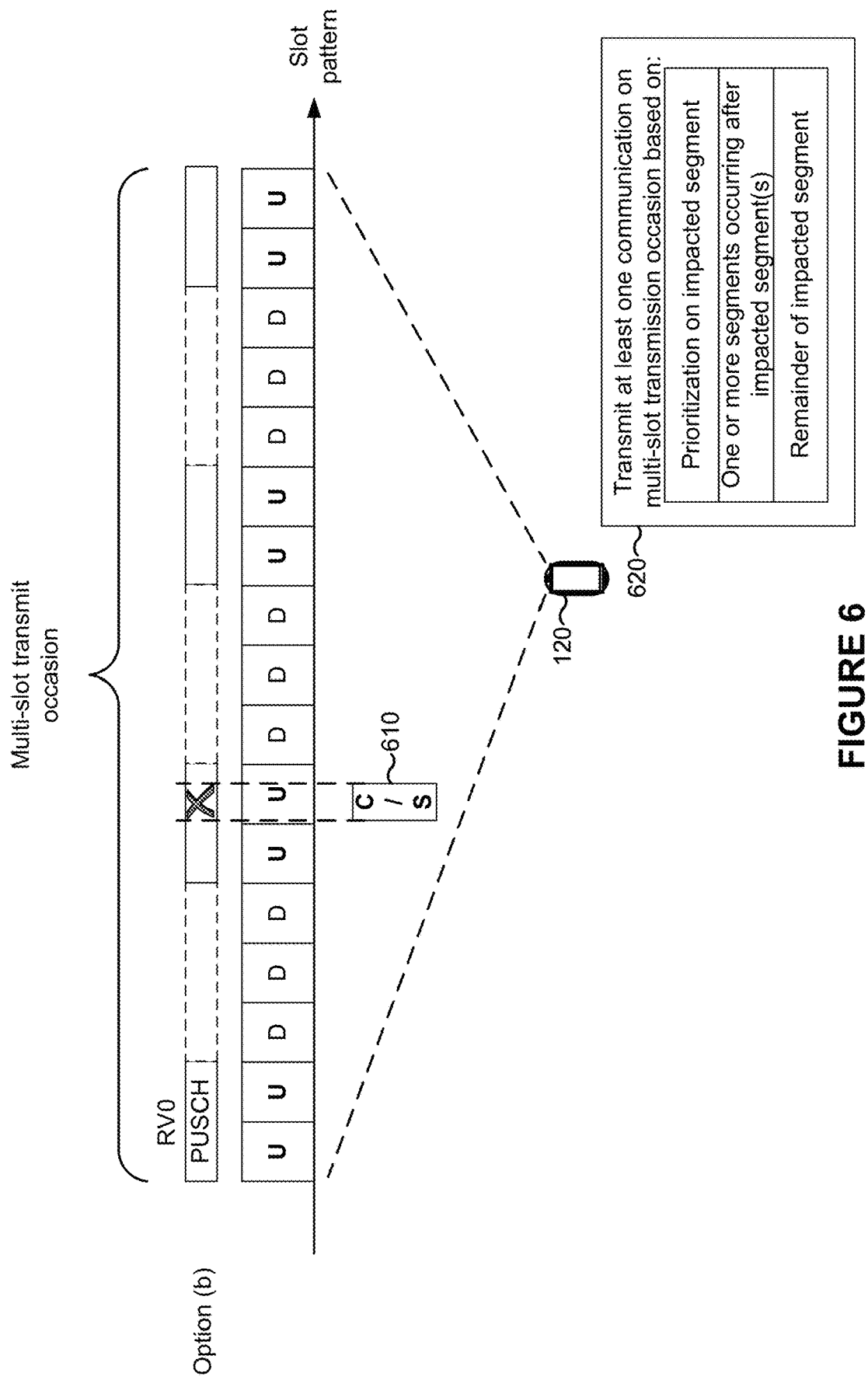
FIG. 6 is a diagram illustrating an example of interruption handling for a control channel or data channel that interrupts a multi-slot transmission occasion in accordance with the present disclosure.

FIG. 6 is a diagram illustrating an example of interruption handling for a control channel or data channel that interrupts a multi-slot transmission occasion in accordance with the present disclosure. The operations of FIG. 6 may be performed by a UE, such as UE 120. As shown, FIG. 6 relates to a multi-slot transmission occasion having a plurality of segments. In some examples, each segment occupies one or more uplink slots. For example, each segment may include a plurality of contiguous slots. Thus, FIG. 6 relates to Option (b) described in FIG. 5. In the multi-slot transmission occasion of FIG. 6, a PUSCH is distributed across 4 segments, which are collectively associated with an RV index 0. Thus, a transport block associated with the 4 segments may be distributed across the 4 segments.

In FIG. 6, an interruption of an impacted segment of the multi-slot transmission occasion is caused by an interrupting communication 610. The interrupting communication 610 may be an uplink transmission, such as a PUCCH (indicated by the "C" in the block) or a PUSCH (such as a single-shot PUSCH, and indicated by the "S" in the block). As shown, the interrupting communication 610 overlaps with at least a portion of the impacted segment, which is a second segment of the multi-slot transmission occasion. As shown, the portion is shorter than a slot. In some aspects, the portion may be included within a single slot. In some aspects, the portion may span multiple slots. In some aspects, an interrupting communication may overlap with multiple segments of the multi-slot transmission occasion, and each of the overlapped segments may be referred to as impacted segments.

In an operation 620, the UE may transmit at least one communication on the multi-slot transmission occasion. The at least one communication may include at least one of the interrupting communication 610 or part or all of a multi-slot communication associated with the multi-slot transmission occasion. In some aspects, the UE may identify the interruption based at least in part on an instance of a PUCCH overlapping with the impacted segment or a single-shot PUSCH associated with the impacted segment (such as based at least in part on the overlapping communication 610), as described elsewhere herein.

In some aspects, the UE may transmit the at least one communication based at least in part on prioritization on the impacted segment. In some aspects, the UE may prioritize the interrupting communication 610 over the multi-slot communication. For example, the UE may transmit the interrupting communication 610 and may cancel the multi-slot communication in overlapped resources of the impacted segment, thus freeing the overlapped resources for transmission of the interrupting communication 610. In other aspects, the UE may prioritize the interrupting communication 610 if the interrupting communication 610 is scheduled with repetitions. For example, the UE may transmit the interrupting communication 610 and may cancel the multi-slot communication in overlapped resources of the impacted segment, thus freeing the overlapped resources for transmission of a repetition of the interrupting communication 610 and improving reliability of repetitious communications.

In yet other aspects, the UE may prioritize the interrupting communication 610 if the interrupting communication 610 is scheduled without repetitions. For example, the UE may transmit the interrupting communication 610 and may cancel the multi-slot communication in overlapped resources of the impacted segment, thus freeing the overlapped resources for transmission of the interrupting communication 610 and preserving the single repetition of the interrupting communication 610.

In still other aspects, the UE may prioritize the interrupting communication 610 if the multi-slot communication is scheduled via a configured grant. For example, the UE may transmit the interrupting communication 610 and may cancel the multi-slot communication in overlapped resources of the impacted segment, thus freeing the overlapped resources for transmission of the interrupting communication 610.

In other aspects, the UE may prioritize the interrupting communication 610 if the interrupting communication 610 has a higher priority than the multi-slot communication. For example, the UE may transmit a single-shot PUSCH and may cancel the multi-slot communication in overlapped resources of the impacted segment if the single-shot PUSCH is associated with a priority that is higher than a priority of the multi-slot communication, thus freeing the overlapped resources for transmission of the single-shot PUSCH and preserving the priority of the single-shot PUSCH.

In yet other aspects, the UE may prioritize the interrupting communication 610 if the interrupting communication 610 is scheduled by a dynamic grant and the multi-slot communication is scheduled without repetition. For example, the UE may transmit a single-shot PUSCH and may cancel the multi-slot communication in overlapped resources of the impacted segment if the single-shot PUSCH is scheduled by a dynamic grant and the multi-slot communication is associated with repetitions, thus freeing the overlapped resources for transmission of the single-shot PUSCH and ensuring that the single-shot PUSCH is transmitted.

In some aspects, as shown, the UE may transmit the at least one communication based at least in part on one or more segments occurring after the impacted segment. In FIG. 6, the one or more segments are the third and fourth segment. In some aspects, the UE may cancel all subsequent transmission of the multi-slot transmission occasion after the impacted segment, which may free resources for other communication and simplify implementation at the UE.

In other aspects, the UE may cancel transmission in the impacted segment (such as in an overlapped part of the impacted segment or an entirety of the impacted segment, as described elsewhere herein), and may transmit the multi-slot communication in the one or more segments occurring after the impacted segment. In some aspects, the UE may resume transmission of the multi-slot communication from a point at which the multi-slot communication was interrupted, as described in connection with FIG. 9, which may improve reliability and performance of the multi-slot communication. In other aspects, the UE may resume transmission of the multi-slot communication as though the interrupted part of the multi-slot communication was carried out. For example, the UE may drop bits of the interrupted part of the multi-slot communication, which may simplify implementation at the UE.

In some aspects, the UE may selectively cancel all subsequent transmission, or transmit the multi-slot communication in the one or more slots subsequent to the impacted segment, based at least in part on at least one of a capability of the UE or a configuration of the multi-slot communication. For example, the UE may signal capability information indicating whether the UE is capable of resuming the multi-slot communication or is capable of maintaining the point at which the multi-slot communication was interrupted (to facilitate resuming at the point). As another example, the configuration of at least one of the multi-slot communication or the multi-slot transmission occasion may indicate whether the UE is to selectively cancel all subsequent transmission, or transmit the multi-slot communication in the one or more slots subsequent to the impacted segment. As still another example, the UE may selectively cancel all subsequent transmission, or transmit the multi-slot communication in the one or more slots subsequent to the impacted segment, based at least in part on an RV cycling configuration or an interleaving configuration of the multi-slot transmission occasion. Thus, conformance with the UE's capabilities is improved, which improves efficiency of communication and versatility of configuration.

In some aspects, as shown, the UE may transmit the at least one communication based at least in part on a remainder of the impacted segment. The remainder of the impacted segment includes one or more non-overlapped symbols of the impacted segment such as at least one of one or more symbols before a first overlapped symbol of the impacted segment or one or more symbols after a last overlapped symbol of the impacted segment. In some aspects, the overlapped symbol(s) may be interrupted based at least in part on an uplink communication 610. Additionally or alternatively, the overlapped symbol(s) may be interrupted based at least in part on an uplink cancellation indication, as described below in connection with FIG. 7. In some aspects, the UE may cancel transmission on the remainder of the impacted segment. In other aspects, the UE may transmit the multi-slot communication in the one or more symbols occurring after the impacted segment. In some aspects, the UE may resume transmission of the multi-slot communication from a point at which the multi-slot communication was interrupted, as described in connection with FIG. 9, which may improve reliability and performance of the multi-slot communication. In other aspects, the UE may resume transmission of the multi-slot communication as though the interrupted part of the multi-slot communication on the impacted segment was carried out. For example, the UE may drop bits of the interrupted part of the multi-slot communication, which may simplify implementation at the UE.

Figure 7:
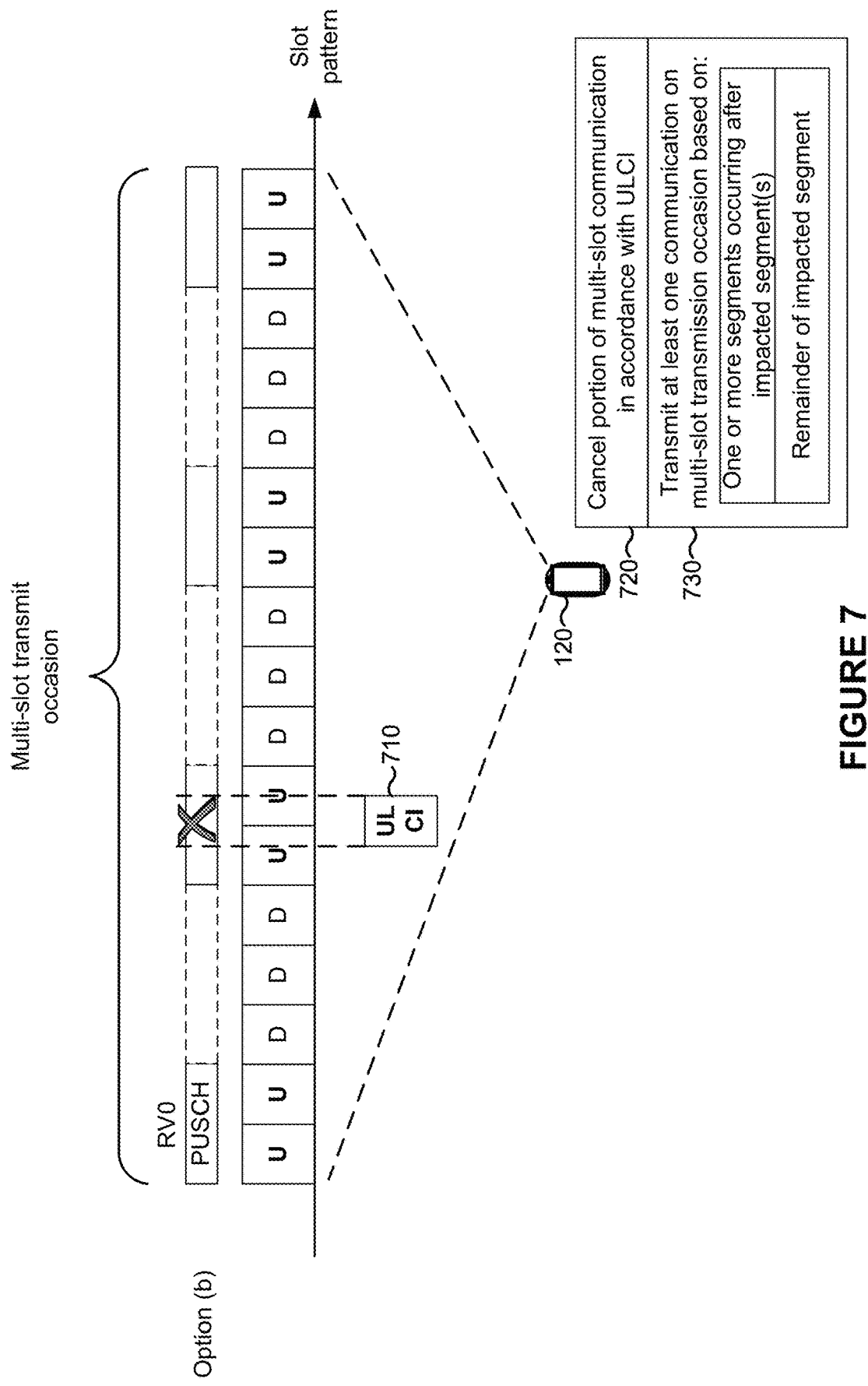
FIG. 7 is a diagram illustrating an example of interruption handling for an uplink cancellation indication (ULCI) that interrupts a multi-slot transmission occasion in accordance with the present disclosure.

FIG. 7 is a diagram illustrating an example of interruption handling for an uplink cancellation indication (ULCI) that interrupts a multi-slot transmission occasion in accordance with the present disclosure. The operations of FIG. 7 may be performed by a UE, such as UE 120. As shown, FIG. 7 relates to a multi-slot transmission occasion having a plurality of segments. Each segment occupies a plurality of contiguous uplink slots. Thus, FIG. 7 relates to Option (b) described in FIG. 5. In the multi-slot transmission occasion of FIG. 7, a PUSCH is distributed across 4 segments, which are collectively associated with an RV index 0. Thus, a transport block associated with the 4 segments may be distributed across the 4 segments.

In FIG. 7, an interruption of an impacted segment of the multi-slot transmission occasion is caused by a ULCI 710. The UE may receive the ULCI from a base station such as base station 110. The ULCI 710 may identify a resource and may indicate that uplink transmission on the resource is to be cancelled by the UE. As shown, an interrupting resource (such as one or more slots or one or more symbols) indicated by the ULCI 710 overlaps with at least a portion of the impacted segment, which is a second segment of the multi-slot transmission occasion. For example, the portion may be within a single slot, or may span across multiple slots. In some aspects, an interrupting resource may overlap with multiple segments of the multi-slot transmission occasion, and each of the overlapped segments may be referred to as impacted segments. The interrupting resource of the ULCI 710 may be referred to herein as an interrupting communication.

In an operation 720, the UE may cancel a portion of the multi-slot communication in accordance with the ULCI 710. For example, the UE may cancel an overlapped portion of the impacted segment based at least in part on the ULCI 710. In an operation 730, the UE may transmit at least one communication based at least in part on the ULCI 710. For example, the at least one communication may include at least part of a multi-slot communication associated with the multi-slot transmission occasion. In some aspects, the UE may identify the interruption based at least in part on the resource identified by the ULCI 710 overlapping the impacted segment (such as based at least in part on the overlapping communication 610), as described elsewhere herein In some aspects, as shown, the UE may transmit the at least one communication based at least in part on one or more segments occurring after the impacted segment. In FIG. 7, the one or more segments are the third and fourth segment. In some aspects, the UE may cancel all subsequent transmission of the multi-slot transmission occasion after the impacted segment, which may free resources for other communication and simplify implementation at the UE.

In other aspects, the UE may cancel transmission in the impacted segment (such as in an overlapped part of the impacted segment or an entirety of the impacted segment, as described elsewhere herein), and may transmit the multi-slot communication in the one or more segments occurring after the impacted segment. In some aspects, the UE may resume transmission of the multi-slot communication from a point at which the multi-slot communication was interrupted, as described in connection with FIG. 9, which may improve reliability and performance of the multi-slot communication. In other aspects, the UE may resume transmission of the multi-slot communication as though the interrupted part of the multi-slot communication was carried out. For example, the UE may drop bits of the interrupted part of the multi-slot communication, which may simplify implementation at the UE.

In some aspects, the UE may selectively cancel all subsequent transmission, or transmit the multi-slot communication in the one or more slots subsequent to the impacted segment, based at least in part on at least one of a capability of the UE or a configuration of the multi-slot communication. For example, the UE may signal capability information indicating whether the UE is capable of resuming the multi-slot communication or is capable of maintaining the point at which the multi-slot communication was interrupted (to facilitate resuming at the point). As another example, the configuration of at least one of the multi-slot communication or the multi-slot transmission occasion may indicate whether the UE is to selectively cancel all subsequent transmission, or transmit the multi-slot communication in the one or more slots subsequent to the impacted segment. As still another example, the UE may selectively cancel all subsequent transmission, or transmit the multi-slot communication in the one or more slots subsequent to the impacted segment, based at least in part on an RV cycling configuration or an interleaving configuration of the multi-slot transmission occasion. Thus, conformance with the UE's capabilities is improved, which improves efficiency of communication and versatility of configuration.

In some aspects, as shown, the UE may transmit the at least one communication based at least in part on a remainder of the impacted segment. The remainder of the impacted segment includes one or more non-overlapped symbols of the impacted segment such as at least one of one or more symbols before a first overlapped symbol of the impacted segment or one or more symbols after a last overlapped symbol of the impacted segment. In some aspects, the overlapped symbol(s) may be interrupted based at least in part on an uplink communication 610. Additionally or alternatively, the overlapped symbol(s) may be interrupted based at least in part on an uplink cancellation indication. In some aspects, the UE may cancel transmission on the remainder of the impacted segment. In other aspects, the UE may transmit the multi-slot communication in the one or more symbols occurring after the impacted segment. In some aspects, the UE may resume transmission of the multi-slot communication from a point at which the multi-slot communication was interrupted, as described in connection with FIG. 9, which may improve reliability and performance of the multi-slot communication. In other aspects, the UE may resume transmission of the multi-slot communication as though the interrupted part of the multi-slot communication on the impacted segment was carried out. For example, the UE may drop bits of the interrupted part of the multi-slot communication, which may simplify implementation at the UE. In some aspects, the UE may resuming the multi-slot communication based at least in part on a minimum time gap between a last cancelled symbol of the impacted segment and a first symbol of a subsequent segment in which the multi-slot communication resumes.

Figure 8:
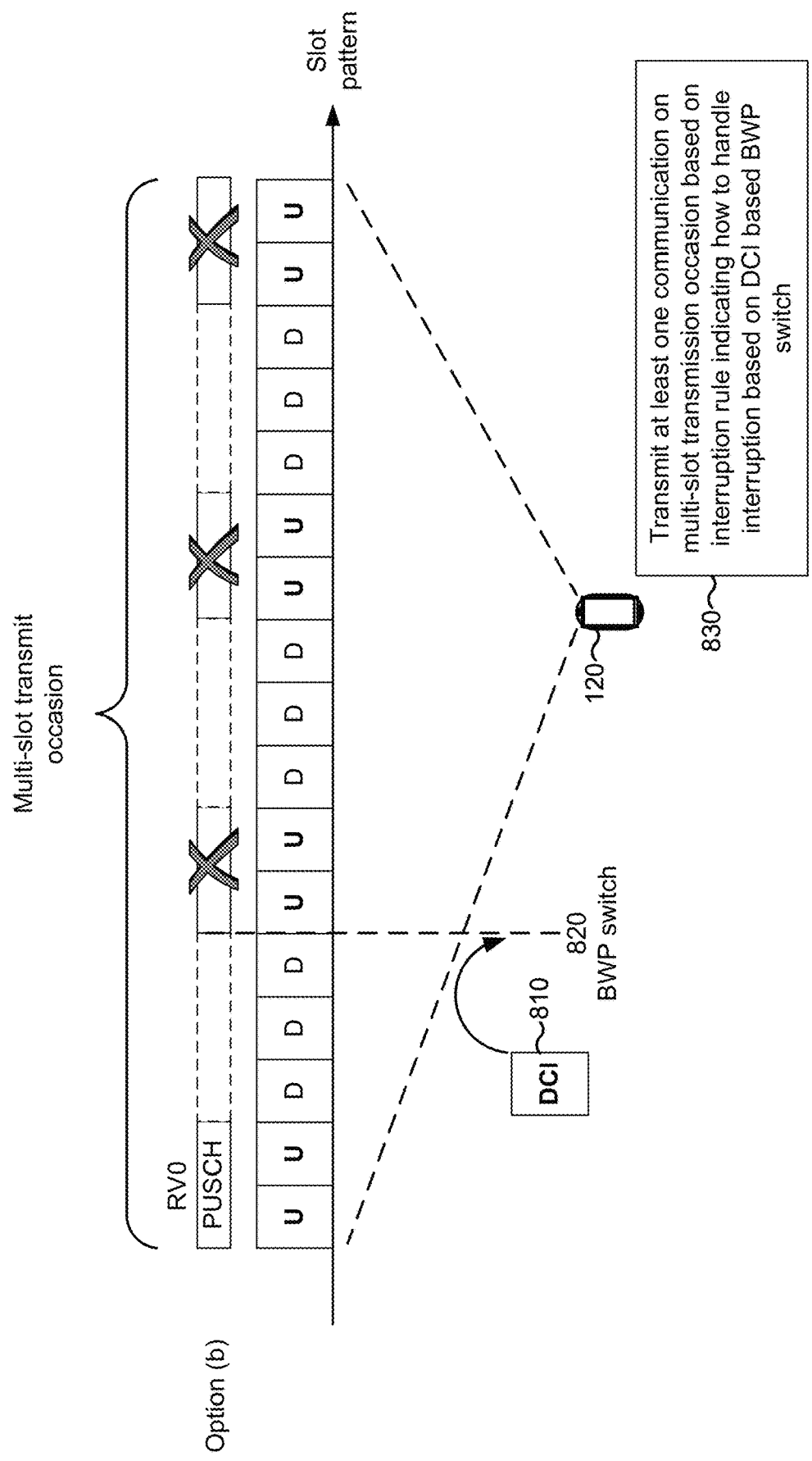
FIG. 8 is a diagram illustrating an example of interruption handling for a BWP switch that interrupts a multi-slot transmission occasion in accordance with the present disclosure.

In some aspects, the UE may perform the operations described with regard to FIG. 7 or FIG. 8 based at least in part on an interruption rule. For example, the interruption rule may indicate an action that the UE is to take based at least in part on identifying an interruption. More specifically, the interruption rule may indicate how to handle prioritization on an impacted segment, one or more segments occurring after an impacted segment, or a remainder of an impacted segment. Similarly, a base station (such as base station 110) may use an interruption rule to determine how to handle prioritization on an impacted segment, a UE's transmission one or more segments occurring after an impacted segment, or a UE's transmission on a remainder of an impacted segment. For example, the base station may receive a multi-slot communication or an interrupting communication in accordance with the interruption rule, where the interruption rule specifies the actions that the UE may take based at least in part on identifying an interruption.

FIG. 8 is a diagram illustrating an example of interruption handling for a BWP switch that interrupts a multi-slot transmission occasion in accordance with the present disclosure. The operations of FIG. 8 may be performed by a UE, such as UE 120. As shown, FIG. 8 relates to a multi-slot transmission occasion having a plurality of segments. Each segment occupies a plurality of contiguous uplink slots. Thus, FIG. 8 relates to Option (b) described in FIG. 5. In the multi-slot transmission occasion of FIG. 8, a PUSCH is distributed across 4 segments, which are collectively associated with an RV index 0. Thus, a transport block associated with the 4 segments may be distributed across the 4 segments.

In FIG. 8, an interruption of an impacted segment of the multi-slot transmission occasion is caused by DCI 810 triggering a BWP switch 820. A UE may communicate using BWPs. A BWP is a contiguous set of PRBs on a given carrier. The contiguous set of PRBs may be selected from a contiguous subset of the common resource blocks (RBs) for a given numerology. A BWP may be defined based at least in part on subcarrier spacing, symbol duration, and cyclic prefix (CP) length. A UE may be configured with multiple BWPs. A base station can activate a given BWP, or can switch the UE from one configured BWP to an updated configured BWP using DCI signaling, such as DCI 810.

The UE may receive the DCI 810 from a base station such as base station 110. In some aspects, the DCI 810 may use a format such as DCI format 1_0. The DCI 810 may indicate an updated BWP for the UE. If the UE were to switch to the updated BWP at the point shown by 820, such as prior to completion of the multi-slot communication, then a remainder of the multi-slot communication after the switch would be interrupted.

In an operation 830, the UE may transmit at least one communication on the multi-slot transmission occasion based at least in part on an interruption rule. The interruption rule may indicate how to handle interruption based at least in part on the DCI based BWP switch. In some aspects, the UE may transmit the at least one communication without reference to an interruption rule. In some aspects, the UE may transmit the at least one communication based at least in part on identifying the interruption of the multi-slot communication, such as based at least in part on the DCI 810 (which may be referred to as a DCI based BWP switch indication) that indicates to switch to the updated BWP prior to completion of the multi-slot communication.

In some aspects, the UE may treat the DCI based BWP switch (or the DCI 810) as an error event. For example, the UE may ignore the DCI 810. In this case, the UE may transmit the multi-slot communication including data on the impacted segment based on treating the DCI based BWP switch indication as an error event.

In other aspects, the UE may postpone the BWP switch (such as the point indicated by 820) until after the multi-slot communication is completed. For example, the UE may transmit the multi-slot communication including data on the impacting segment, and may switch to the updated BWP after completion of the multi-slot communication based at least in part on the DCI 810.

In yet other aspects, the UE may follow the DCI 810 and may switch to the updated BWP in accordance with the DCI 810. For example, the UE may switch at the point indicated by 820. In this case, the UE may perform the switch irrespective of whether the updated BWP contains the resources originally assigned for the multi-slot transmission or not, and may drop remaining transmissions of the multi-slot communication after the BWP switch is performed. This may enable the base station to trigger early termination of a multi-slot communication, for example, by providing a DCI 810 indicating a BWP switch.

In some aspects, for a multi-slot communication having multiple segments separated by some number of symbols or slots (as in FIG. 8), when a DCI 810 arrives requesting the UE to activate a different BWP (such as an updated BWP) between any two segments of the multi-slot communication, and when a processing timeline of the UE is such that the switch is to occur before the end of the multi-slot communication, the remaining multi-slot communication is dropped and the updated BWP is activated. In other aspects, for a multi-slot communication having multiple segments separated by some number of symbols or slots (as in FIG. 8), when a DCI 810 arrives requesting the UE to activate a different BWP (such as an updated BWP) between any two segments of the multi-slot communication, and when a processing timeline of the UE is such that the switch is to occur before the end of the multi-slot communication, the activating DCI is ignored under certain conditions and the multi-slot communication is completed. In yet other aspects, for a multi-slot communication having multiple segments separated by some number of symbols or slots (as in FIG. 8), when a DCI 810 arrives requesting the UE to activate a different BWP (such as an updated BWP) between any two segments of the multi-slot communication, and when a processing timeline of the UE is such that the switch is to occur before the end of the multi-slot communication, the activation time is postponed until an end of multi-slot communication.

Figure 9:
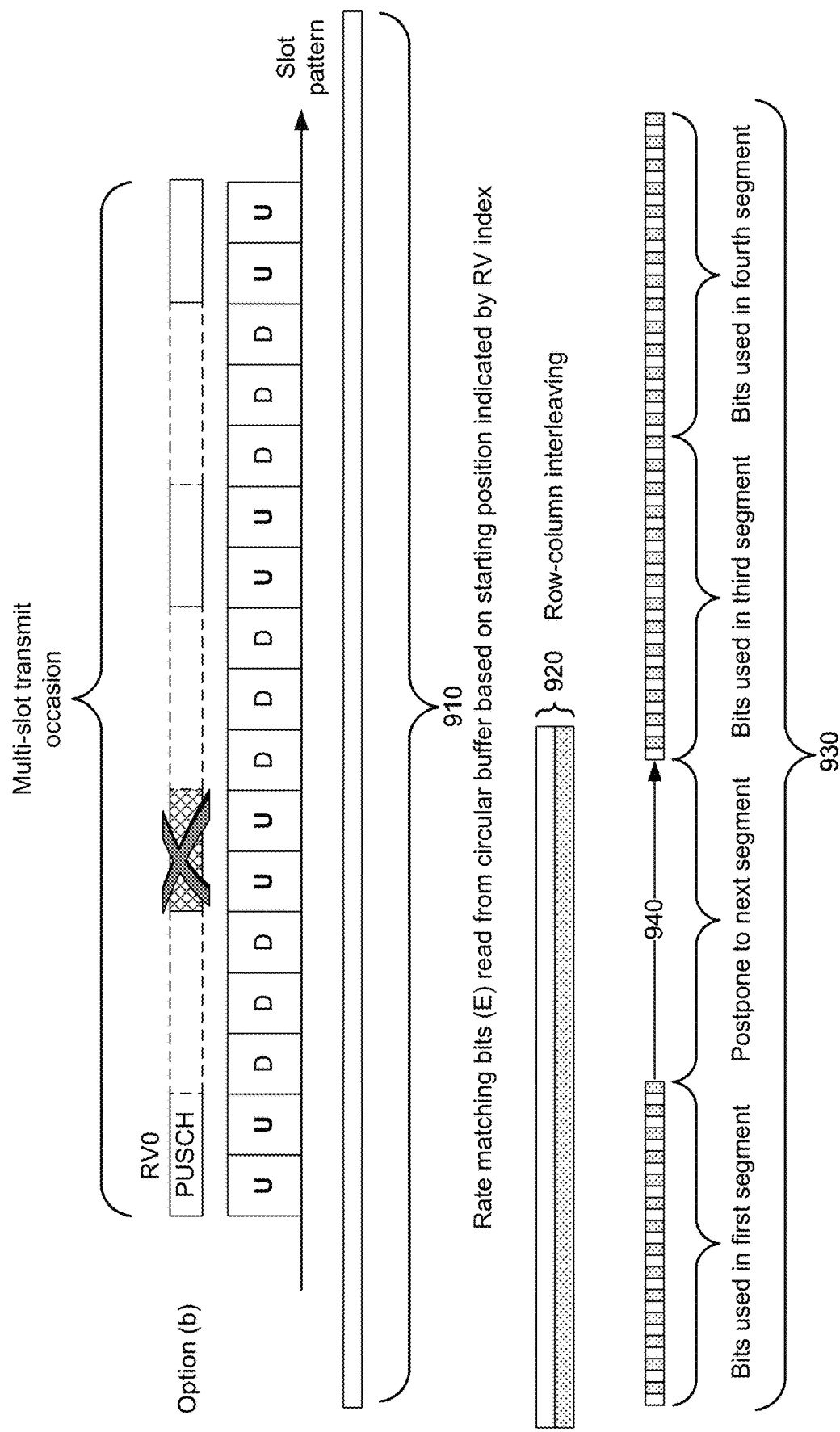
FIG. 9 is a diagram illustrating an example of interleaving for an impacted segment involving postponing bits of the impacted segment in accordance with the present disclosure.
Figure 10:
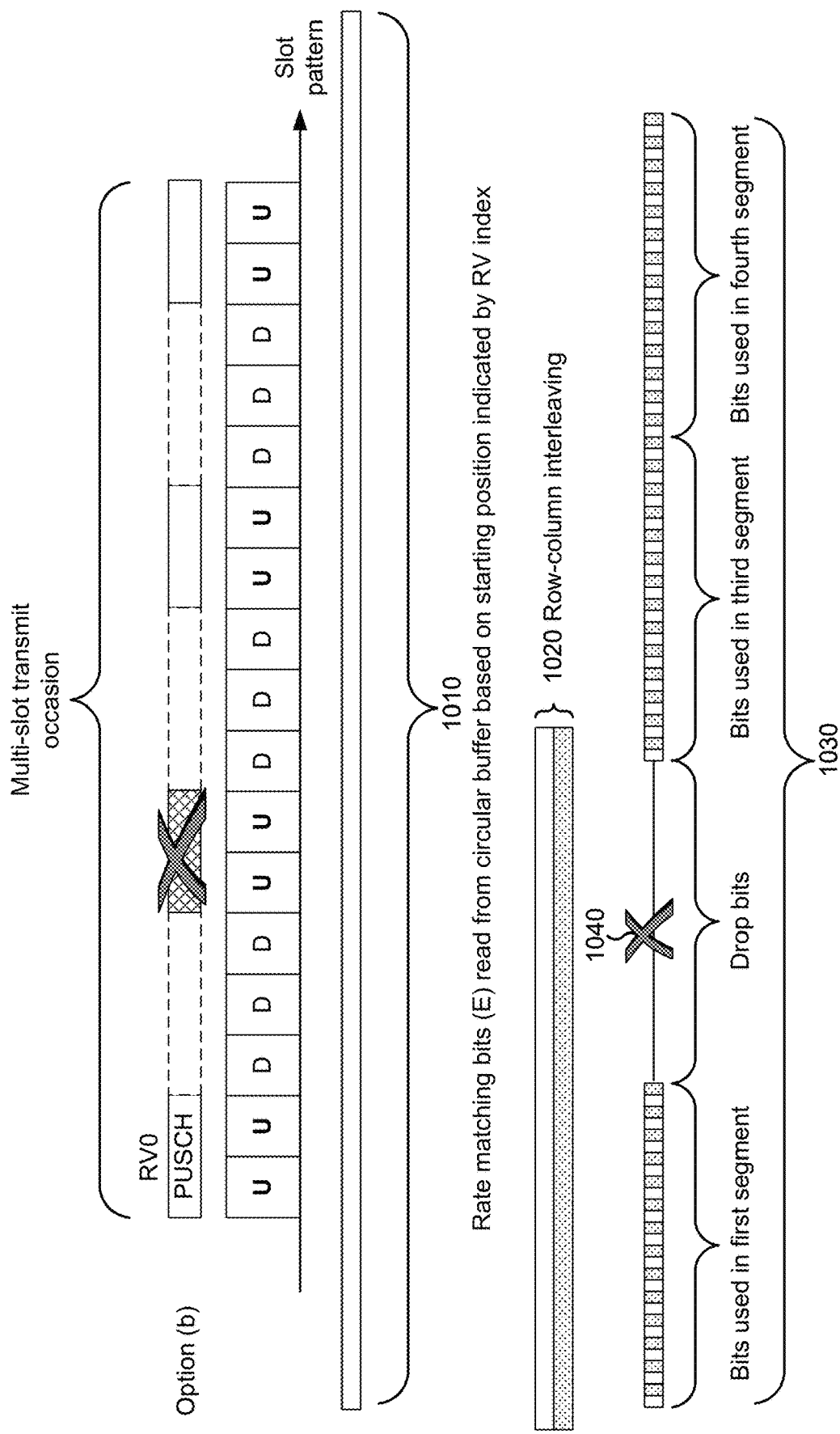
FIG. 10 is a diagram illustrating an example of interleaving for an impacted segment involving dropping bits of the impacted segment in accordance with the present disclosure.

FIG. 9 is a diagram illustrating an example of interleaving for an impacted segment involving postponing bits of the impacted segment in accordance with the present disclosure. The operations of FIG. 9 may be performed by a UE, such as UE 120. As shown, FIG. 9 relates to a multi-slot transmission occasion having a plurality of segments. Each segment occupies a plurality of contiguous uplink slots. Thus, FIG. 9 relates to Option (b) described in FIG. 5, and to the examples of FIGS. 6 and 7. In the multi-slot transmission occasion of FIG. 9, a PUSCH is distributed across 4 segments, which are collectively associated with an RV index 0. Thus, a transport block associated with the 4 segments may be distributed across the 4 segments. A second segment is an impacted segment associated with an interrupting communication or a ULCI, as indicated by the "X" over the second segment. While FIGS. 9 and 10 illustrate an entire segment being canceled, in some aspects, the cancellation may begin after a set of first symbols of a given segment. In this case, bits on the set of first symbols may be transmitted, and bits after the set of first symbols may be canceled.

As shown, the UE may select a plurality of bits 910 (E). For example, the UE may select the plurality of bits 910 based at least in part on the coding chain described in connection with FIG. 3 and the RV techniques described in connection with FIG. 4. As further shown, the UE may perform row-column interleaving to generate two rows of bits 920. Then, the UE may interleave the two rows of bits 920 to generate interleaved bits 930. As shown in FIG. 9 at 940, bits associated with an impacted segment are postponed for transmission in a next segment. For example, if the entire impacted segment of the multi-slot communication is canceled (as shown), then the UE may postpone all bits of the impacted segment for transmission in the third segment. If one or more symbols of the impacted segment are canceled (not shown), then the UE may postpone bits of the one or more symbols for transmission in the third segment. As mentioned above, postponing the bits improves transmission performance and reliability.

FIG. 10 is a diagram illustrating an example of interleaving for an impacted segment involving dropping bits of the impacted segment in accordance with the present disclosure. The operations of FIG. 10 may be performed by a UE, such as UE 120. As shown, FIG. 10 relates to a multi-slot transmission occasion having a plurality of segments. Each segment occupies a plurality of contiguous uplink slots. Thus, FIG. 10 relates to Option (b) described in FIG. 5, and to the examples of FIGS. 6 and 7. In the multi-slot transmission occasion of FIG. 10, a PUSCH is distributed across 4 segments, which are collectively associated with an RV index 0. Thus, a transport block associated with the 4 segments may be distributed across the 4 segments. A second segment is an impacted segment associated with an interrupting communication or a ULCI, as indicated by the "X" over the second segment.

As shown, the UE may select a plurality of bits 1010 (E). For example, the UE may select the plurality of bits 1010 based at least in part on the coding chain described in connection with FIG. 3 and the RV techniques described in connection with FIG. 4. As further shown, the UE may perform row-column interleaving to generate two rows of bits 1020. Then, the UE may interleave the two rows of bits 1020 to generate interleaved bits 1030. As shown in FIG. 10 at 1040, bits associated with an impacted segment are dropped and are not transmitted in a next segment. For example, if the entire impacted segment of the multi-slot communication is canceled, then the UE may drop all bits of the impacted segment. If one or more symbols of the impacted segment are canceled, then the UE may drop bits of the one or more symbols for transmission in the third segment. As mentioned above, dropping the bits reduces UE complexity.

In some aspects of FIGS. 5-10, the UE may receive an indication of a plurality of sets of contiguous time domain resources for a multi-slot transmission occasion. For example, each set of contiguous time domain resources may correspond to a segment of the multi-slot transmission occasion. In some aspects, the indication may be received via radio resource control (RRC) signaling, medium access control (MAC) signaling, DCI, a combination thereof, or similar signaling. In some aspects, the indication may indicate a configuration associated with one or more of the multi-slot communication or the multi-slot transmission occasion, such as a configured grant, information indicating an RV index, scheduling information for the multi-slot communication, a priority associated with the multi-slot communication, or the like.

Figure 11:
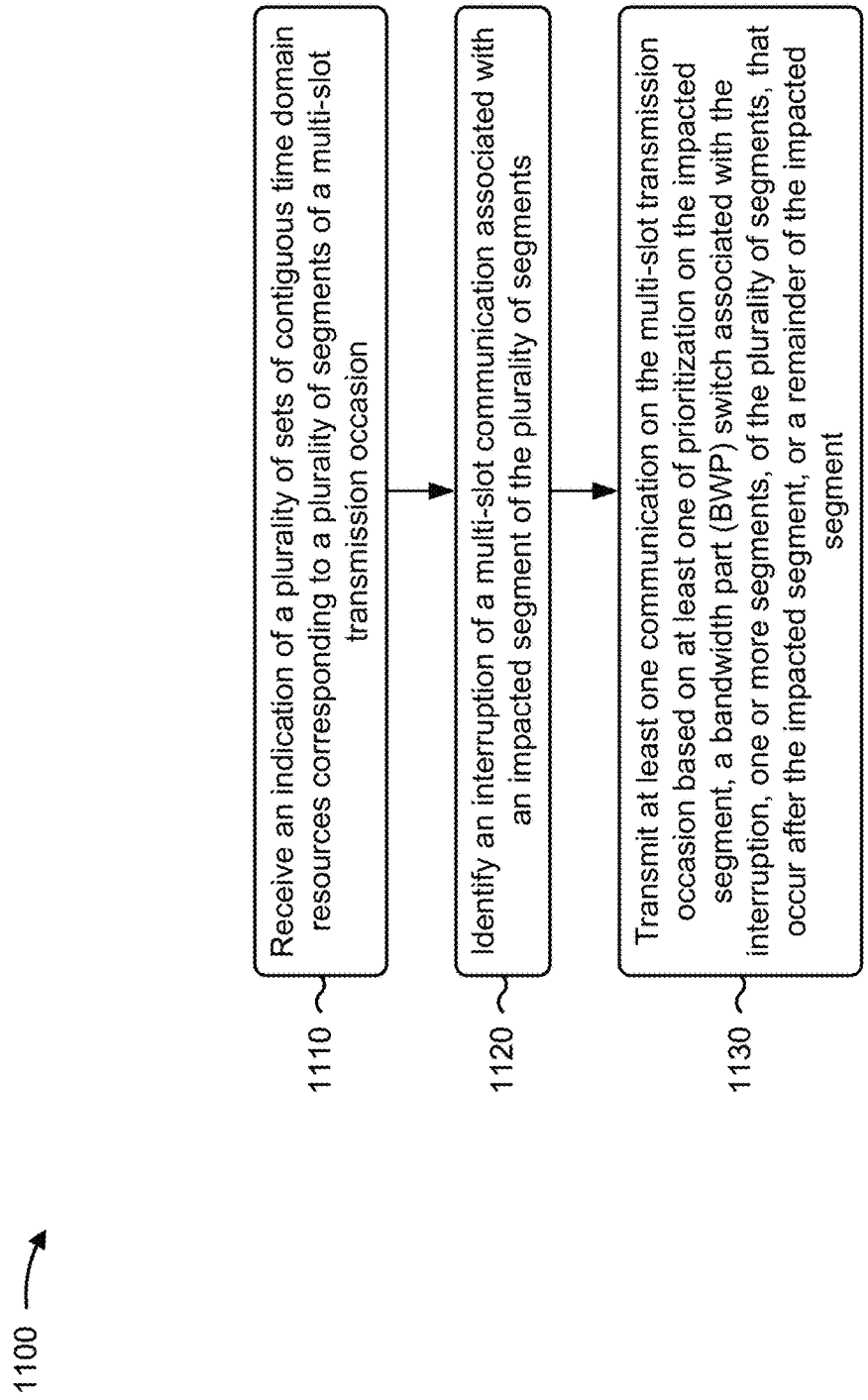
FIG. 11 is a flowchart illustrating an example process for interruption handling for a multi-slot communication performed, for example, by a UE in accordance with the present disclosure.

FIG. 11 is a flowchart illustrating an example process 1100 for interruption handling for a multi-slot communication performed, for example, by a UE in accordance with the present disclosure. Example process 1100 is an example where the UE (for example, UE 120) performs operations associated with interruption handling for multi-slot uplink transmissions.

As shown in FIG. 11, in some aspects, process 1100 may include receiving an indication of a plurality of sets of contiguous time domain resources corresponding to a plurality of segments of a multi-slot transmission occasion (block 1110). For example, the UE (such as by using reception component 1302, depicted in FIG. 13) may receive an indication of a plurality of sets of contiguous time domain resources corresponding to a plurality of segments of a multi-slot transmission occasion, as described above.

As further shown in FIG. 11, in some aspects, process 1100 may include identifying an interruption of a multi-slot communication associated with an impacted segment of the plurality of segments (block 1120). For example, the UE (such as by using interruption identification component 1310, depicted in FIG. 13) may identify an interruption of a multi-slot communication associated with an impacted segment of the plurality of segments, as described above.

As further shown in FIG. 11, in some aspects, process 1100 may include transmitting at least one communication on the multi-slot transmission occasion based on at least one of: prioritization on the impacted segment, a BWP switch associated with the interruption, one or more segments, of the plurality of segments, that occur after the impacted segment, or a remainder of the impacted segment (block 1130). For example, the UE (such as by using transmission component 1306, depicted in FIG. 13) may transmit at least one communication on the multi-slot transmission occasion based on at least one of: prioritization on the impacted segment, a BWP switch associated with the interruption, one or more segments, of the plurality of segments, that occur after the impacted segment, or a remainder of the impacted segment, as described above.

Process 1100 may include additional aspects, such as any single aspect or any combination of aspects described below or in connection with one or more other processes described elsewhere herein.

In a first additional aspect, transmitting the at least one communication on the multi-slot transmission occasion is based on an interruption rule.

In a second additional aspect, alone or in combination with the first aspect, process 1100 includes transmitting the interrupting communication during the impacted segment and cancelling the multi-slot communication in interrupted resources of the impacted segment.

In a third additional aspect, alone or in combination with one or more of the first and second aspects, if an interrupting communication associated with the interruption is scheduled with repetitions, process 1100 includes transmitting the interrupting communication during the impacted segment and cancelling the multi-slot communication in interrupted resources of the impacted segment.

In a fourth additional aspect, alone or in combination with one or more of the first through third aspects, if an interrupting communication associated with the interruption is scheduled without repetitions, process 1100 includes transmitting the interrupting communication during the impacted segment and cancelling the multi-slot communication in interrupted resources of the impacted segment.

In a fifth additional aspect, alone or in combination with one or more of the first through fourth aspects, if the multi-slot communication is scheduled via a configured grant, process 1100 includes transmitting the interrupting communication during the impacted segment and cancelling the multi-slot communication in interrupted resources of the impacted segment.

In a sixth additional aspect, alone or in combination with one or more of the first through fifth aspects, identifying the interruption further comprises identifying the interruption based on an instance of a physical uplink control channel overlapping with the impacted segment.

In a seventh additional aspect, alone or in combination with one or more of the first through sixth aspects, if an interrupting communication associated with the interruption is associated with a higher priority than a priority with which the multi-slot communication is associated process 1100 includes transmitting the interrupting communication during the impacted segment and cancelling the multi-slot communication in interrupted resources of the impacted segment.

In an eighth additional aspect, alone or in combination with one or more of the first through seventh aspects, if an interrupting communication associated with the interruption is scheduled by a dynamic grant, process 1100 includes transmitting the interrupting communication during the impacted segment and cancelling the multi-slot communication in interrupted resources of the impacted segment.

In a ninth additional aspect, alone or in combination with one or more of the first through eighth aspects, identifying the interruption further comprises identifying the interruption based on a single slot physical uplink shared channel overlapping with the impacted segment.

In a tenth additional aspect, alone or in combination with one or more of the first through ninth aspects, identifying the interruption further comprises identifying the interruption based on an uplink cancellation indicator that cancels at least a portion of the multi-slot communication on the impacted segment, and transmitting the at least one communication on the multi-slot transmission occasion comprises transmitting the multi-slot communication based on canceling at least the portion of the multi-slot communication on the impacted segment.

In an eleventh additional aspect, alone or in combination with one or more of the first through tenth aspects, identifying the interruption further comprises identifying the interruption based on a DCI based BWP switch indication that indicates to switch to an updated uplink bandwidth part prior to completion of the multi-slot communication.

In a twelfth additional aspect, alone or in combination with one or more of the first through eleventh aspects, transmitting the at least one communication comprises transmitting the multi-slot communication including data on the impacted segment based on treating the DCI based BWP switch indication as an error event.

In a thirteenth additional aspect, alone or in combination with one or more of the first through twelfth aspects, transmitting the at least communication comprises transmitting the multi-slot communication including data on the impacted segment.

In a fourteenth additional aspect, alone or in combination with one or more of the first through thirteenth aspects, process 1100 includes switching to the updated uplink bandwidth part after completion of the multi-slot communication based on the DCI based BWP switch indication.

In a fifteenth additional aspect, alone or in combination with one or more of the first through fourteenth aspects, transmitting the at least one communication comprises transmitting a first portion of the multi-slot communication before switching to the updated uplink bandwidth part; switching to the updated uplink bandwidth part prior to completion of the multi-slot communication; and canceling a second portion of the multi-slot communication after switching to the updated uplink bandwidth part.

In a sixteenth additional aspect, alone or in combination with one or more of the first through fifteenth aspects, canceling the second portion further comprises cancelling the second portion irrespective of whether the updated uplink bandwidth part includes resources of the multi-slot transmission occasion.

In a seventeenth additional aspect, alone or in combination with one or more of the first through sixteenth aspects, the DCI based BWP switch indication indicates to switch to the updated uplink bandwidth part prior to completion of the multi-slot communication based on a processing timeline associated with the UE.

In an eighteenth additional aspect, alone or in combination with one or more of the first through seventeenth aspects, process 1100 includes canceling transmission on the one or more segments that occur after the impacted segment.

In a nineteenth additional aspect, alone or in combination with one or more of the first through eighteenth aspects, process 1100 includes canceling transmission on the impacted segment, where transmission on one or more segments that occur after the impacted segment is not cancelled.

In a twentieth additional aspect, alone or in combination with one or more of the first through nineteenth aspects, process 1100 includes resuming the multi-slot communication, after the impacted segment, with data that was to be transmitted in the impacted segment.

In a twenty-first additional aspect, alone or in combination with one or more of the first through twentieth aspects, process 1100 includes resuming the multi-slot communication, after the impacted segment, omitting data that was to be transmitted in the impacted segment.

In a twenty-second additional aspect, alone or in combination with one or more of the first through twenty-first aspects, process 1100 includes resuming the multi-slot communication based on a minimum time gap between a last cancelled symbol of the impacted segment and a first symbol of a subsequent segment in which the multi-slot communication resumes.

In a twenty-third additional aspect, alone or in combination with one or more of the first through twenty-second aspects, process 1100 includes determining, based on a capability of the UE or a configuration of the multi-slot transmission occasion, at least one of whether the one or more segments that occur after the impacted segment are to be cancelled, or whether, after the impacted segment, the multi-slot communication is to be resumed including data that was to be transmitted in the impacted segment or omitting data that was to be transmitted in the impacted segment.

In a twenty-fourth additional aspect, alone or in combination with one or more of the first through twenty-third aspects, the configuration of the multi-slot transmission occasion indicates how interleaving and rate matching are handled across slot boundaries.

In a twenty-fifth additional aspect, alone or in combination with one or more of the first through twenty-fourth aspects, the remainder of the impacted segment comprises one or more symbols after an impacted portion of the impacted segment, and where the method comprises cancelling transmission over the one or more symbols.

In a twenty-sixth additional aspect, alone or in combination with one or more of the first through twenty-fifth aspects, the remainder of the impacted segment comprises one or more symbols after an impacted portion of the impacted segment, and where the method comprises transmitting the multi-slot communication over the one or more symbols.

In a twenty-seventh additional aspect, alone or in combination with one or more of the first through twenty-sixth aspects, process 1100 includes resuming the multi-slot communication in the one or more symbols with data that was to be transmitted in the impacted segment.

In a twenty-eighth additional aspect, alone or in combination with one or more of the first through twenty-seventh aspects, process 1100 includes resuming the multi-slot communication in the one or more symbols omitting data that was to be transmitted in the impacted segment.

In a twenty-ninth additional aspect, alone or in combination with one or more of the first through twenty-eighth aspects, process 1100 includes determining, based on a capability of the UE or a configuration of the multi-slot transmission occasion, at least one of whether to cancel the multi-slot communication on the remainder of the impacted segment, or whether, in the remainder of the impacted segment, the multi-slot communication is to be resumed including data that was to be transmitted in the impacted segment or omitting data that was to be transmitted in the impacted segment.

In a thirtieth additional aspect, alone or in combination with one or more of the first through twenty-ninth aspects, the configuration of the multi-slot transmission occasion indicates how interleaving and rate matching are handled across slot boundaries.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
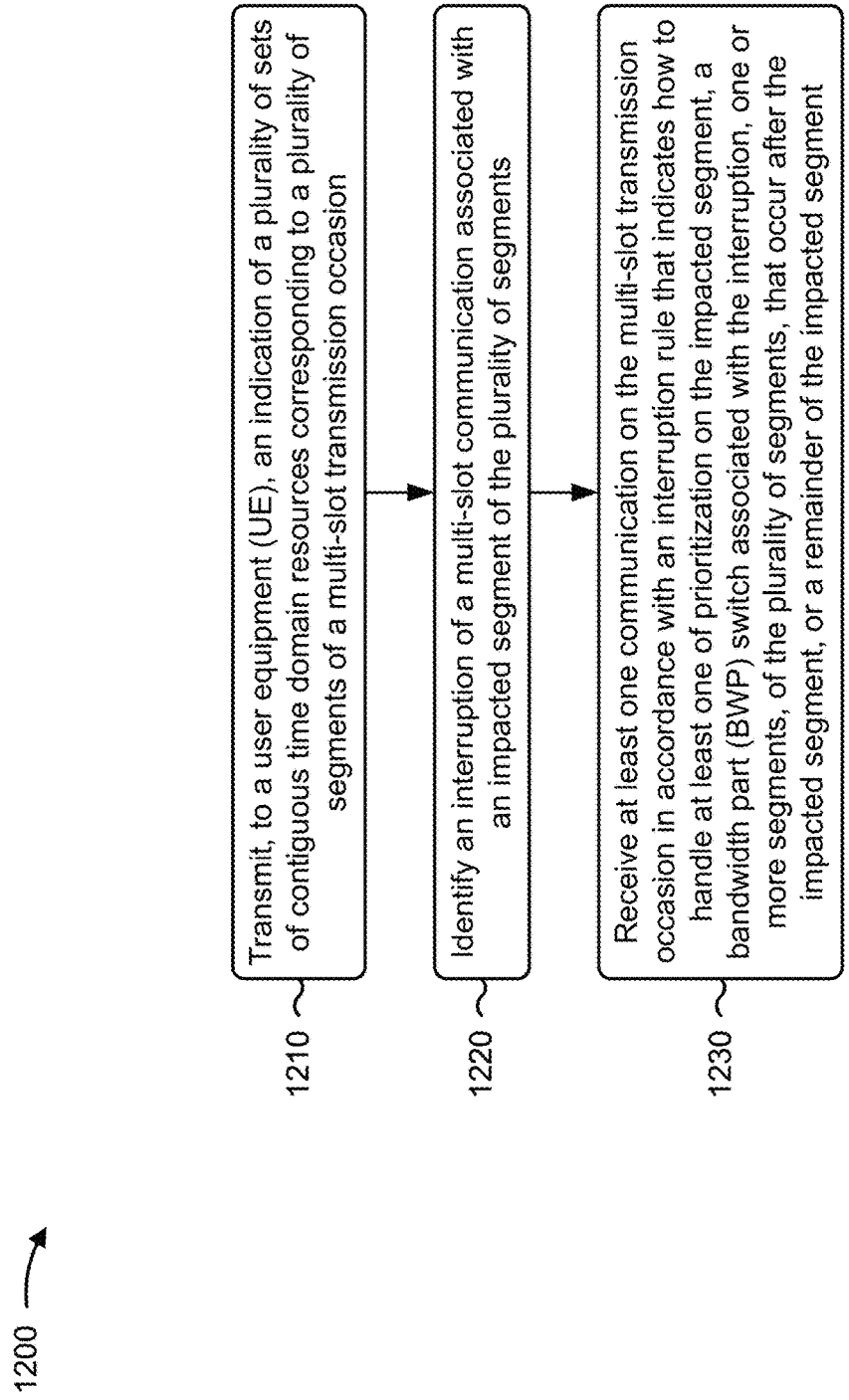
FIG. 12 is a flowchart illustrating an example process for interruption handling for a multi-slot communication performed, for example, by a base station in accordance with the present disclosure.

FIG. 12 is a flowchart illustrating an example process for interruption handling for a multi-slot communication performed, for example, by a base station in accordance with the present disclosure. Example process 1200 is an example where the base station (for example, base station 110) performs operations associated with interruption handling for multi-slot uplink transmissions.

As shown in FIG. 12, in some aspects, process 1200 may include transmitting, to a UE, an indication of a plurality of sets of contiguous time domain resources corresponding to a plurality of segments of a multi-slot transmission occasion (block 1210). For example, the base station (such as by using transmission component 1406, depicted in FIG. 14) may transmit, to a UE, an indication of a plurality of sets of contiguous time domain resources corresponding to a plurality of segments of a multi-slot transmission occasion, as described above.

As further shown in FIG. 12, in some aspects, process 1200 may include identifying an interruption of a multi-slot communication associated with an impacted segment of the plurality of segments (block 1220). For example, the base station (such as by using interruption identification component 1410, depicted in FIG. 14) may identify an interruption of a multi-slot communication associated with an impacted segment of the plurality of segments, as described above.

As further shown in FIG. 12, in some aspects, process 1200 may include receiving at least one communication on the multi-slot transmission occasion in accordance with an interruption rule that indicates how to handle at least one of: prioritization on the impacted segment, a BWP switch associated with the interruption, one or more segments, of the plurality of segments, that occur after the impacted segment, or a remainder of the impacted segment (block 1230). For example, the base station (such as by using reception component 1402, depicted in FIG. 14) may receive at least one communication on the multi-slot transmission occasion in accordance with an interruption rule that indicates how to handle at least one of: prioritization on the impacted segment, a BWP switch associated with the interruption, one or more segments, of the plurality of segments, that occur after the impacted segment, or a remainder of the impacted segment, as described above.

Process 1200 may include additional aspects, such as any single aspect or any combination of aspects described below or in connection with one or more other processes described elsewhere herein.

In a first aspect, the interruption rule indicates to transmit the interrupting communication during the impacted segment and to cancel the multi-slot communication in interrupted resources of the impacted segment.

In a second additional aspect, alone or in combination with the first additional aspect, if an interrupting communication associated with the interruption is scheduled with repetitions, the interruption rule indicates to transmit the interrupting communication during the impacted segment, and to cancel the multi-slot communication in interrupted resources of the impacted segment.

In a third additional aspect, alone or in combination with one or more of the first through second additional aspects, if an interrupting communication associated with the interruption is scheduled without repetitions, the interruption rule indicates to transmit the interrupting communication during the impacted segment and to cancel the multi-slot communication in interrupted resources of the impacted segment.

In a fourth additional aspect, alone or in combination with one or more of the first through third additional aspects, if the multi-slot communication is scheduled via a configured grant, the interruption rule indicates to transmit the interrupting communication during the impacted segment and to cancel the multi-slot communication in interrupted resources of the impacted segment.

In a fifth additional aspect, alone or in combination with one or more of the first through fourth additional aspects, identifying the interruption further comprises identifying the interruption based on an instance of a physical uplink control channel overlapping with the impacted segment.

In a sixth additional aspect, alone or in combination with one or more of the first through fifth additional aspects, if an interrupting communication associated with the interruption is associated with a higher priority than the multi-slot communication, the interruption rule indicates to transmit the interrupting communication during the impacted segment and to cancel the multi-slot communication in interrupted resources of the impacted segment.

In a seventh additional aspect, alone or in combination with one or more of the first through sixth additional aspects, if an interrupting communication associated with the interruption is scheduled by a dynamic grant, the interruption rule indicates to transmit the interrupting communication during the impacted segment and to cancel the multi-slot communication in interrupted resources of the impacted segment.

In an eighth additional aspect, alone or in combination with one or more of the first through seventh aspects, identifying the interruption further comprises identifying the interruption based on a single slot physical uplink shared channel overlapping with the impacted segment.

In a ninth additional aspect, alone or in combination with one or more of the first through eighth aspects, process 1200 includes receiving the multi-slot communication having canceled at least the portion of the multi-slot communication on the impacted segment.

In a tenth additional aspect, alone or in combination with one or more of the first through ninth aspects, process 1200 includes transmitting a DCI based BWP switch indication that indicates to switch to an updated uplink bandwidth part prior to completion of the multi-slot communication, where the DCI based BWP switch causes the interruption.

In an eleventh additional aspect, alone or in combination with one or more of the first through tenth aspects, the interruption rule indicates that the DCI based BWP switch indication is treated as an error event, and receiving the at least one communication comprises receiving the multi-slot communication including data on the impacted segment.

In a twelfth additional aspect, alone or in combination with one or more of the first through eleventh aspects, the interruption rule indicates to switch to the updated uplink bandwidth part after completion of the multi-slot communication, and where receiving the at least one communication comprises receiving the multi-slot communication including data on the impacted segment.

In a thirteenth additional aspect, alone or in combination with one or more of the first through twelfth aspects, process 1200 includes switching the UE to the updated uplink bandwidth part after completion of the multi-slot communication based on the DCI based BWP switch indication.

In a fourteenth additional aspect, alone or in combination with one or more of the first through thirteenth aspects, the interruption rule indicates to switch to the updated uplink bandwidth part prior to completion of the multi-slot communication, and where receiving the at least one communication comprises receiving a first portion of the multi-slot communication before a switch to the updated uplink bandwidth part, and canceling a second portion of the multi-slot communication after the switch to the updated uplink bandwidth part.

In a fifteenth additional aspect, alone or in combination with one or more of the first through fourteenth aspects, canceling the second portion comprises cancelling the second portion irrespective of whether the updated uplink bandwidth part includes resources of the multi-slot transmission occasion.

In a sixteenth additional aspect, alone or in combination with one or more of the first through fifteenth aspects, the DCI based BWP switch indication indicates to switch to the updated uplink bandwidth part prior to completion of the multi-slot communication based on a processing timeline associated with the UE.

In a seventeenth additional aspect, alone or in combination with one or more of the first through sixteenth aspects, the interruption rule indicates that transmission on the one or more segments that occur after the impacted segment are to be cancelled.

In an eighteenth additional aspect, alone or in combination with one or more of the first through seventeenth aspects, the interruption rule indicates that transmission on the one or more segments that occur after the impacted segment is not to be cancelled, and that transmission on the impacted segment is to be cancelled.

In a nineteenth additional aspect, alone or in combination with one or more of the first through eighteenth aspects, process 1200 includes resuming the multi-slot communication, after the impacted segment, including data that was to be transmitted in the impacted segment.

In a twentieth additional aspect, alone or in combination with one or more of the first through nineteenth aspects, process 1200 includes resuming the multi-slot communication, after the impacted segment, omitting data that was to be transmitted in the impacted segment.

In a twenty-first additional aspect, alone or in combination with one or more of the first through twentieth aspects, process 1200 includes resuming the multi-slot communication based on a minimum time gap between a last cancelled symbol of the impacted segment and a first symbol of a subsequent segment in which the multi-slot communication resumes.

In a twenty-second additional aspect, alone or in combination with one or more of the first through twenty-first aspects, process 1200 includes determining, based on a capability of the UE or a configuration of the multi-slot transmission occasion, at least one of whether the one or more segments that occur after the impacted segment are to be cancelled, or whether, after the impacted segment, the multi-slot communication is to be resumed with data that was to be transmitted in the impacted segment or omitting data that was to be transmitted in the impacted segment.

In a twenty-third additional aspect, alone or in combination with one or more of the first through twenty-second aspects, the configuration of the multi-slot transmission occasion indicates how interleaving and rate matching are handled across slot boundaries.

In an twenty-fourth additional aspect, alone or in combination with one or more of the first through twenty-third aspects, the remainder of the impacted segment comprises one or more symbols after an impacted portion of the impacted segment, and where the interruption rule indicates to cancel transmission over the one or more symbols.

In a twenty-fifth additional aspect, alone or in combination with one or more of the first through twenty-fourth aspects, the remainder of the impacted segment comprises one or more symbols after an impacted portion of the impacted segment, and where the interruption rule indicates to perform the multi-slot communication over the one or more symbols.

In a twenty-sixth additional aspect, alone or in combination with one or more of the first through twenty-fifth aspects, process 1200 includes resuming the multi-slot communication in the one or more symbols with data that was to be transmitted in the impacted segment.

In a twenty-seventh additional aspect, alone or in combination with one or more of the first through twenty-sixth aspects, the multi-slot communication is resumed in the one or more symbols omitting data that was to be transmitted in the impacted segment.

In a twenty-eighth additional aspect, alone or in combination with one or more of the first through twenty-seventh aspects, process 1200 includes determining, based on a capability of the UE or a configuration of the multi-slot transmission occasion, at least one of whether to cancel the transmission on the remainder of the impacted segment, or whether, in the remainder of the impacted segment, the multi-slot communication is to be resumed with data that was to be transmitted in the impacted segment or omitting data that was to be transmitted in the impacted segment.

In a twenty-ninth additional aspect, alone or in combination with one or more of the first through twenty-eighth aspects, the configuration of the multi-slot transmission occasion indicates how interleaving and rate matching are handled across slot boundaries.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
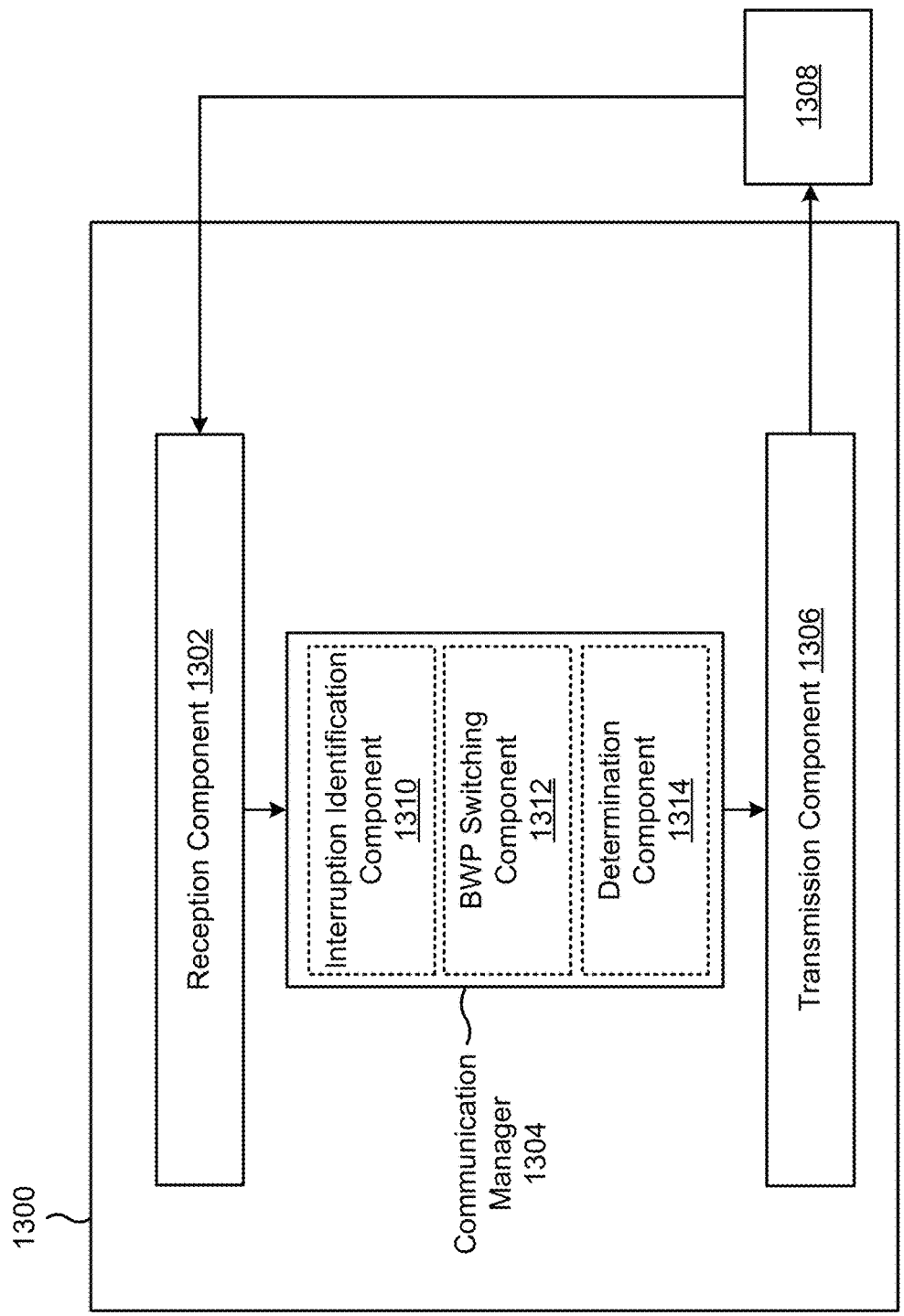
FIGS. 13-14 are block diagrams of example apparatuses for wireless communication in accordance with the present disclosure.

FIG. 13 is a block diagram of an example apparatus 1300 for wireless communication in accordance with the present disclosure. The apparatus 1300 may be a UE, or a UE may include the apparatus 1300. In some aspects, the apparatus 1300 includes a reception component 1302, a communication manager 1304, and a transmission component 1306, which may be in communication with one another (for example, via one or more buses). As shown, the apparatus 1300 may communicate with another apparatus 1308 (such as a UE, a base station, or another wireless communication device) using the reception component 1302 and the transmission component 1306.

In some aspects, the apparatus 1300 may be configured to perform one or more operations described herein in connection with FIGS. 3-10. Additionally or alternatively, the apparatus 1300 may be configured to perform one or more processes described herein, such as process 1100 of FIG. 11 or a combination thereof. In some aspects, the apparatus 1300 may include one or more components of the UE described above in connection with FIG. 2.

The reception component 1302 may receive communications, such as reference signals, control information, data communications, or a combination thereof, from the apparatus 1308. The reception component 1302 may provide received communications to one or more other components of the apparatus 1300, such as the communication manager 1304. In some aspects, the reception component 1302 may perform signal processing on the received communications (such as filtering, amplification, demodulation, analog-todigital conversion, demultiplexing, deinterleaving, de-mapping, equalization, interference cancellation, or decoding, among other examples), and may provide the processed signals to the one or more other components. In some aspects, the reception component 1302 may include one or more antennas, a demodulator, a MIMO detector, a receive processor, a controller/processor, a memory, or a combination thereof, of the UE described above in connection with FIG. 2.

The transmission component 1306 may transmit communications, such as reference signals, control information, data communications, or a combination thereof, to the apparatus 1308. In some aspects, the communication manager 1304 may generate communications and may transmit the generated communications to the transmission component 1306 for transmission to the apparatus 1308. In some aspects, the transmission component 1306 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1306 may include one or more antennas, a modulator, a transmit MIMO processor, a transmit processor, a controller/processor, a memory, or a combination thereof, of the UE described above in connection with FIG. 2. In some aspects, the transmission component 1306 may be co-located with the reception component 1302 in a transceiver.

The communication manager 1304 may receive or may cause the reception component 1302 to receive an indication of a plurality of sets of contiguous time domain resources corresponding to a plurality of segments of a multi-slot transmission occasion. The communication manager 1304 may identify an interruption of a multi-slot communication associated with an impacted segment of the plurality of segments. The communication manager 1304 may transmit or may cause the transmission component 1306 to transmit at least one communication on the multi-slot transmission occasion based on at least one of prioritization on the impacted segment, a BWP switch associated with the interruption, one or more segments, of the plurality of segments, that occur after the impacted segment, or a remainder of the impacted segment. In some aspects, the communication manager 1304 may perform one or more operations described elsewhere herein as being performed by one or more components of the communication manager 1304.

The communication manager 1304 may include a controller/processor, a memory, a scheduler, a communication unit, or a combination thereof, of the UE described above in connection with FIG. 2. In some aspects, the communication manager 1304 includes a set of components, such as an interruption identification component 1310, a BWP switching component 1312, a determination component 1314, or a combination thereof. Alternatively, the set of components may be separate and distinct from the communication manager 1304. In some aspects, one or more components of the set of components may include or may be implemented within a controller/processor, a memory, a scheduler, a communication unit, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive an indication of a plurality of sets of contiguous time domain resources corresponding to a plurality of segments of a multi-slot transmission occasion. The interruption identification component 1310 may identify an interruption of a multi-slot communication associated with an impacted segment of the plurality of segments. The transmission component 1306 may transmit at least one communication on the multi-slot transmission occasion based on at least one of prioritization on the impacted segment, a BWP switch associated with the interruption, one or more segments, of the plurality of segments, that occur after the impacted segment, or a remainder of the impacted segment.

The transmission component 1306 may transmit the interrupting communication during the impacted segment and cancel the multi-slot communication in interrupted resources of the impacted segment.

The BWP switching component 1312 may switch to the updated uplink bandwidth part after completion of the multi-slot communication based on the DCI based BWP switch indication.

The transmission component 1306 may cancel transmission on the one or more segments that occur after the impacted segment.

The transmission component 1306 may cancel transmission on the impacted segment, where transmission on one or more segments that occur after the impacted segment is not cancelled.

The transmission component 1306 may resume the multi-slot communication, after the impacted segment, with data that was to be transmitted in the impacted segment.

The transmission component 1306 may resume the multi-slot communication, after the impacted segment, omitting data that was to be transmitted in the impacted segment.

The transmission component 1306 may resume the multi-slot communication based on a minimum time gap between a last cancelled symbol of the impacted segment and a first symbol of a subsequent segment in which the multi-slot communication resumes.

The determination component 1314 may determine, based on a capability of the UE or a configuration of the multi-slot transmission occasion, at least one of whether the one or more segments that occur after the impacted segment are to be cancelled, or whether, after the impacted segment, the multi-slot communication is to be resumed including data that was to be transmitted in the impacted segment or omitting data that was to be transmitted in the impacted segment.

The transmission component 1306 may resume the multi-slot communication in the one or more symbols with data that was to be transmitted in the impacted segment.

The transmission component 1306 may resume the multi-slot communication in the one or more symbols omitting data that was to be transmitted in the impacted segment.

The determination component 1314 may determine, based on a capability of the UE or a configuration of the multi-slot transmission occasion, at least one of whether to cancel the multi-slot communication on the remainder of the impacted segment, or whether, in the remainder of the impacted segment, the multi-slot communication is to be resumed including data that was to be transmitted in the impacted segment or omitting data that was to be transmitted in the impacted segment.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
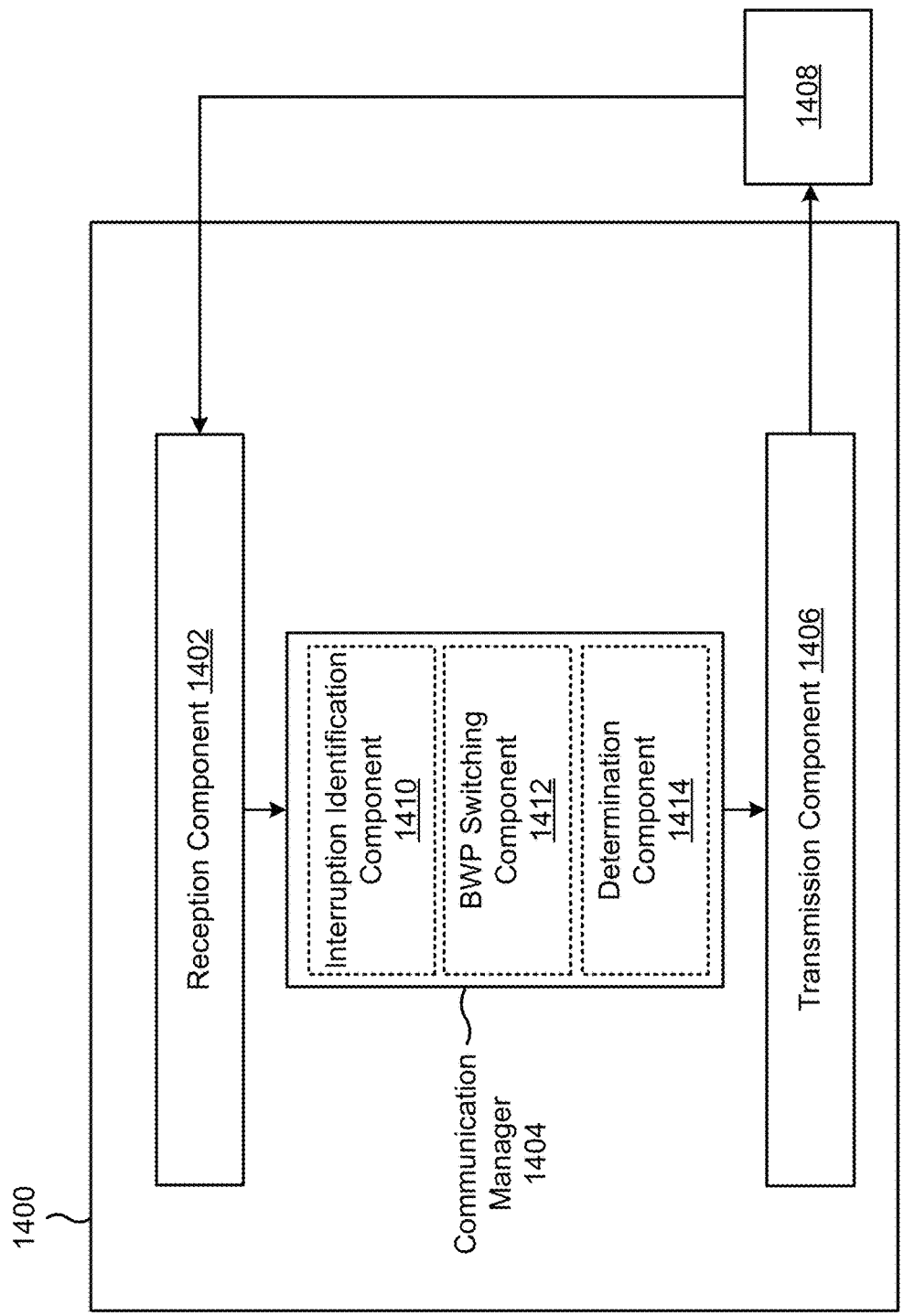

FIG. 14 is a block diagram of an example apparatus 1400 for wireless communication in accordance with the present disclosure. The apparatus 1400 may be a base station, or a base station may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a UE, a base station, or another wireless communication device) using the reception component 1402 and the transmission component 1406.

In some aspects, the apparatus 1400 may be configured to perform one or more operations described herein in connection with FIGS. 3-10. Additionally or alternatively, the apparatus 1400 may be configured to perform one or more processes described herein, such as process 1200 of FIG. 12 or a combination thereof. In some aspects, the apparatus 1400 may include one or more components of the base station described above in connection with FIG. 2.

The reception component 1402 may receive communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the base station described above in connection with FIG. 2.

The transmission component 1406 may transmit communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the base station described above in connection with FIG. 2. In some aspects, the transmission component 1406 may be co-located with the reception component 1402 in a transceiver.

The communication manager 1404 may transmit or may cause the transmission component 1406 to transmit, to a UE, an indication of a plurality of sets of contiguous time domain resources corresponding to a plurality of segments of a multi-slot transmission occasion. The communication manager 1404 may identify an interruption of a multi-slot communication associated with an impacted segment of the plurality of segments. The communication manager 1404 may receive or may cause the reception component 1402 to receive at least one communication on the multi-slot transmission occasion in accordance with an interruption rule that indicates how to handle at least one of prioritization on the impacted segment, a BWP switch associated with the interruption, one or more segments, of the plurality of segments, that occur after the impacted segment, or a remainder of the impacted segment. In some aspects, the communication manager 1404 may perform one or more operations described elsewhere herein as being performed by one or more components of the communication manager 1404.

The communication manager 1404 may include a controller/processor, a memory, a scheduler, a communication unit, or a combination thereof, of the base station described above in connection with FIG. 2. In some aspects, the communication manager 1404 includes a set of components, such as an interruption identification component 1410, a BWP switching component 1412, a determination component 1414, or a combination thereof. Alternatively, the set of components may be separate and distinct from the communication manager 1404. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1406 may transmit, to a UE, an indication of a plurality of sets of contiguous time domain resources corresponding to a plurality of segments of a multi-slot transmission occasion. The interruption identification component 1410 may identify an interruption of a multi-slot communication associated with an impacted segment of the plurality of segments. The reception component 1402 may receive at least one communication on the multi-slot transmission occasion in accordance with an interruption rule that indicates how to handle at least one of prioritization on the impacted segment, a BWP switch associated with the interruption, one or more segments, of the plurality of segments, that occur after the impacted segment, or a remainder of the impacted segment.

The reception component 1402 may receive the multi-slot communication having canceled at least the portion of the multi-slot communication on the impacted segment.

The transmission component 1406 may transmit a DCI based BWP switch indication that indicates to switch to an updated uplink bandwidth part prior to completion of the multi-slot communication, where the DCI based BWP switch causes the interruption.

The BWP switching component 1412 may switch the UE to the updated uplink bandwidth part after completion of the multi-slot communication based on the DCI based BWP switch indication.

The transmission component 1406 may resume the multi-slot communication, after the impacted segment, including data that was to be transmitted in the impacted segment.

The transmission component 1406 may resume the multi-slot communication, after the impacted segment, omitting data that was to be transmitted in the impacted segment.

The transmission component 1406 may resume the multi-slot communication based on a minimum time gap between a last cancelled symbol of the impacted segment and a first symbol of a subsequent segment in which the multi-slot communication resumes.

The determination component 1414 may determine, based on a capability of the UE or a configuration of the multi-slot transmission occasion, at least one of whether the one or more segments that occur after the impacted segment are to be cancelled, or whether, after the impacted segment, the multi-slot communication is to be resumed with data that was to be transmitted in the impacted segment or omitting data that was to be transmitted in the impacted segment.

The transmission component 1406 may resume the multi-slot communication in the one or more symbols with data that was to be transmitted in the impacted segment.

The determination component 1414 may determine, based on a capability of the UE or a configuration of the multi-slot transmission occasion, at least one of whether to cancel the transmission on the remainder of the impacted segment, or whether, in the remainder of the impacted segment, the multi-slot communication is to be resumed with data that was to be transmitted in the impacted segment or omitting data that was to be transmitted in the impacted segment.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving an indication of a plurality of sets of contiguous time domain resources corresponding to a plurality of segments of a multi-slot transmission occasion; identifying an interruption of a multi-slot communication associated with an impacted segment of the plurality of segments; and transmitting at least one communication on the multi-slot transmission occasion based on at least one of: prioritization on the impacted segment, a bandwidth part (BWP) switch associated with the interruption, one or more segments, of the plurality of segments, that occur after the impacted segment, or a remainder of the impacted segment.

Aspect 2: The method of Aspect 1, where transmitting the at least one communication on the multi-slot transmission occasion is based on an interruption rule.

Aspect 3: The method of any of Aspects 1-2, where transmitting the at least one communication on the multi-slot transmission occasion further comprises transmitting the interrupting communication during the impacted segment and cancelling the multi-slot communication in interrupted resources of the impacted segment.

Aspect 4: The method of any of Aspects 1-3, where, if an interrupting communication associated with the interruption is scheduled with repetitions, transmitting the at least one communication on the multi-slot transmission occasion further comprises transmitting the interrupting communication during the impacted segment and cancelling the multi-slot communication in interrupted resources of the impacted segment.

Aspect 5: The method of any of Aspects 1-4, where, if an interrupting communication associated with the interruption is scheduled without repetitions, transmitting the at least one communication on the multi-slot transmission occasion further comprises transmitting the interrupting communication during the impacted segment and cancelling the multi-slot communication in interrupted resources of the impacted segment.

Aspect 6: The method of any of Aspects 1-5, where, if the multi-slot communication is scheduled via a configured grant, transmitting the at least one communication on the multi-slot transmission occasion further comprises transmitting the interrupting communication during the impacted segment and cancelling the multi-slot communication in interrupted resources of the impacted segment.

Aspect 7: The method of any of Aspects 1-6, where identifying the interruption further comprises identifying the interruption based on an instance of a physical uplink control channel overlapping with the impacted segment.

Aspect 8: The method of any of Aspects 1-7, where, if an interrupting communication associated with the interruption is associated with a higher priority than a priority with which the multi-slot communication is associated, transmitting the at least one communication on the multi-slot transmission occasion further comprises transmitting the interrupting communication during the impacted segment and cancelling the multi-slot communication in interrupted resources of the impacted segment.

Aspect 9: The method of any of Aspects 1-8, where, if an interrupting communication associated with the interruption is scheduled by a dynamic grant, transmitting the at least one communication on the multi-slot transmission occasion further comprises transmitting the interrupting communication during the impacted segment and cancelling the multi-slot communication in interrupted resources of the impacted segment.

Aspect 10: The method of any of Aspects 1-9, where identifying the interruption further comprises identifying the interruption based on a single slot physical uplink shared channel overlapping with the impacted segment.

Aspect 11: The method of any of Aspects 1-10, where identifying the interruption further comprises identifying the interruption based on an uplink cancellation indicator that cancels at least a portion of the multi-slot communication on the impacted segment, and where transmitting the at least one communication on the multi-slot transmission occasion comprises transmitting the multi-slot communication based on canceling at least the portion of the multi-slot communication on the impacted segment.

Aspect 12: The method of any of Aspects 1-11, where identifying the interruption further comprises identifying the interruption based on a downlink control information (DCI) based BWP switch indication that indicates to switch to an updated uplink bandwidth part prior to completion of the multi-slot communication.

Aspect 13: The method of Aspect 12, where transmitting the at least one communication comprises transmitting the multi-slot communication including data on the impacted segment based on treating the DCI based BWP switch indication as an error event.

Aspect 14: The method of Aspect 12, where transmitting the at least communication comprises transmitting the multi-slot communication including data on the impacted segment.

Aspect 15: The method of Aspect 14, further comprising: switching to the updated uplink bandwidth part after completion of the multi-slot communication based on the DCI based BWP switch indication.

Aspect 16: The method of Aspect 12, where transmitting the at least one communication comprises: transmitting a first portion of the multi-slot communication before switching to the updated uplink bandwidth part switching to the updated uplink bandwidth part prior to completion of the multi-slot communication; and cancelling a second portion of the multi-slot communication after switching to the updated uplink bandwidth part.

Aspect 17: The method of Aspect 16, where cancelling the second portion further comprises cancelling the second portion irrespective of whether the updated uplink bandwidth part includes resources of the multi-slot transmission occasion.

Aspect 18: The method of Aspect 12, where the DCI based BWP switch indication indicates to switch to the updated uplink bandwidth part prior to completion of the multi-slot communication based on a processing timeline associated with the UE.

Aspect 19: The method of any of Aspects 1-18, further comprising cancelling transmission on the one or more segments that occur after the impacted segment.

Aspect 20: The method of any of Aspects 1-19, further comprising cancelling transmission on the impacted segment, where transmission on one or more segments that occur after the impacted segment is not cancelled.

Aspect 21: The method of Aspect 20, further comprising resuming the multi-slot communication, after the impacted segment, with data that was to be transmitted in the impacted segment.

Aspect 22: The method of Aspect 20, further comprising resuming the multi-slot communication, after the impacted segment, omitting data that was to be transmitted in the impacted segment.

Aspect 23: The method of Aspect 20, further comprising resuming the multi-slot communication based on a minimum time gap between a last cancelled symbol of the impacted segment and a first symbol of a subsequent segment in which the multi-slot communication resumes.

Aspect 24: The method of any of Aspects 1-23, further comprising determining, based on a capability of the UE or a configuration of the multi-slot transmission occasion, at least one of: whether the one or more segments that occur after the impacted segment are to be cancelled, or whether, after the impacted segment, the multi-slot communication is to be resumed including data that was to be transmitted in the impacted segment or omitting data that was to be transmitted in the impacted segment.

Aspect 25: The method of Aspect 24, where the configuration of the multi-slot transmission occasion indicates how interleaving and rate matching are handled across slot boundaries.

Aspect 26: The method of any of Aspects 1-25, where the remainder of the impacted segment comprises one or more symbols after an impacted portion of the impacted segment, and where the method comprises cancelling transmission over the one or more symbols.

Aspect 27: The method of any of Aspects 1-26, where the remainder of the impacted segment comprises one or more symbols after an impacted portion of the impacted segment, and where the method comprises transmitting the multi-slot communication over the one or more symbols.

Aspect 28: The method of Aspect 27, further comprising resuming the multi-slot communication in the one or more symbols with data that was to be transmitted in the impacted segment.

Aspect 29: The method of Aspect 27, further comprising resuming the multi-slot communication in the one or more symbols omitting data that was to be transmitted in the impacted segment.

Aspect 30: The method of any of Aspects 1-30, further comprising determining, based on a capability of the UE or a configuration of the multi-slot transmission occasion, at least one of: whether to cancel the multi-slot communication on the remainder of the impacted segment, or whether, in the remainder of the impacted segment, the multi-slot communication is to be resumed including data that was to be transmitted in the impacted segment or omitting data that was to be transmitted in the impacted segment.

Aspect 31: The method of Aspect 30, where the configuration of the multi-slot transmission occasion indicates how interleaving and rate matching are handled across slot boundaries.

Aspect 32: A method of wireless communication performed by a base station, comprising: transmitting, to a user equipment (UE), an indication of a plurality of sets of contiguous time domain resources corresponding to a plurality of segments of a multi-slot transmission occasion; identifying an interruption of a multi-slot communication associated with an impacted segment of the plurality of segments; and receiving at least one communication on the multi-slot transmission occasion in accordance with an interruption rule that indicates how to handle at least one of: prioritization on the impacted segment, a bandwidth part (BWP) switch associated with the interruption, one or more segments, of the plurality of segments, that occur after the impacted segment, or a remainder of the impacted segment.

Aspect 33: The method of Aspect 32, where the interruption rule indicates to transmit the interrupting communication during the impacted segment and to cancel the multi-slot communication in interrupted resources of the impacted segment.

Aspect 34: The method of any of Aspects 32-33, where, if an interrupting communication associated with the interruption is scheduled with repetitions, the interruption rule indicates to transmit the interrupting communication during the impacted segment, and to cancel the multi-slot communication in interrupted resources of the impacted segment.

Aspect 35: The method of any of Aspects 32-34, where, if an interrupting communication associated with the interruption is scheduled without repetitions, the interruption rule indicates to transmit the interrupting communication during the impacted segment and to cancel the multi-slot communication in interrupted resources of the impacted segment.

Aspect 36: The method of any of Aspects 32-35, where, if the multi-slot communication is scheduled via a configured grant, the interruption rule indicates to transmit the interrupting communication during the impacted segment and to cancel the multi-slot communication in interrupted resources of the impacted segment.

Aspect 37: The method of any of Aspects 32-36, where identifying the interruption further comprises identifying the interruption based on an instance of a physical uplink control channel overlapping with the impacted segment.

Aspect 38: The method of any of Aspects 32-37, where, if an interrupting communication associated with the interruption is associated with a higher priority than the multi-slot communication, the interruption rule indicates to transmit the interrupting communication during the impacted segment and to cancel the multi-slot communication in interrupted resources of the impacted segment.

Aspect 39: The method of any of Aspects 32-38, where, if an interrupting communication associated with the interruption is scheduled by a dynamic grant, the interruption rule indicates to transmit the interrupting communication during the impacted segment and to cancel the multi-slot communication in interrupted resources of the impacted segment.

Aspect 40: The method of any of Aspects 32-39, where identifying the interruption further comprises identifying the interruption based on a single slot physical uplink shared channel overlapping with the impacted segment.

Aspect 41: The method of any of Aspects 32-40, further comprising transmitting an uplink cancellation indicator that cancels at least a portion of the multi-slot communication on the impacted segment, where the uplink cancellation indicator causes the interruption, and where receiving the at least one communication on the multi-slot transmission occasion in accordance with the interruption rule further comprises receiving the multi-slot communication having canceled at least the portion of the multi-slot communication on the impacted segment.

Aspect 42: The method of any of Aspects 32-41, further comprising transmitting a downlink control information (DCI) based BWP switch indication that indicates to switch to an updated uplink bandwidth part prior to completion of the multi-slot communication, where the DCI based BWP switch causes the interruption.

Aspect 43: The method of Aspect 42, where the interruption rule indicates that the DCI based BWP switch indication is treated as an error event, and where receiving the at least one communication comprises receiving the multi-slot communication including data on the impacted segment.

Aspect 44: The method of Aspect 42, where the interruption rule indicates to switch to the updated uplink bandwidth part after completion of the multi-slot communication, and where receiving the at least one communication comprises receiving the multi-slot communication including data on the impacted segment.

Aspect 45: The method of Aspect 44, further comprising: switching the UE to the updated uplink bandwidth part after completion of the multi-slot communication based on the DCI based BWP switch indication.

Aspect 46: The method of Aspect 42, where the interruption rule indicates to switch to the updated uplink bandwidth part prior to completion of the multi-slot communication, and where receiving the at least one communication comprises: receiving a first portion of the multi-slot communication before a switch to the updated uplink bandwidth part; and cancelling a second portion of the multi-slot communication after the switch to the updated uplink bandwidth part.

Aspect 47: The method of Aspect 46, where cancelling the second portion comprises cancelling the second portion irrespective of whether the updated uplink bandwidth part includes resources of the multi-slot transmission occasion.

Aspect 48: The method of Aspect 42, where the DCI based BWP switch indication indicates to switch to the updated uplink bandwidth part prior to completion of the multi-slot communication based on a processing timeline associated with the UE.

Aspect 49: The method of any of Aspects 32-48, where the interruption rule indicates that transmission on the one or more segments that occur after the impacted segment are to be cancelled.

Aspect 50: The method of any of Aspects 32-49, where the interruption rule indicates that transmission on the one or more segments that occur after the impacted segment is not to be cancelled, and that transmission on the impacted segment is to be cancelled.

Aspect 51: The method of Aspect 50, further comprising resuming the multi-slot communication, after the impacted segment, including data that was to be transmitted in the impacted segment.

Aspect 52: The method of Aspect 50, further comprising resuming the multi-slot communication, after the impacted segment, omitting data that was to be transmitted in the impacted segment.

Aspect 53: The method of Aspect 50, further comprising resuming the multi-slot communication based on a minimum time gap between a last cancelled symbol of the impacted segment and a first symbol of a subsequent segment in which the multi-slot communication resumes.

Aspect 54: The method of any of Aspects 32-53, further comprising determining, based on a capability of the UE or a configuration of the multi-slot transmission occasion, at least one of: whether the one or more segments that occur after the impacted segment are to be cancelled, or whether, after the impacted segment, the multi-slot communication is to be resumed with data that was to be transmitted in the impacted segment or omitting data that was to be transmitted in the impacted segment.

Aspect 55: The method of Aspect 54, where the configuration of the multi-slot transmission occasion indicates how interleaving and rate matching are handled across slot boundaries.

Aspect 56: The method of any of Aspects 32-55, where the remainder of the impacted segment comprises one or more symbols after an impacted portion of the impacted segment, and where the interruption rule indicates to cancel transmission over the one or more symbols.

Aspect 57: The method of any of Aspects 32-56, where the remainder of the impacted segment comprises one or more symbols after an impacted portion of the impacted segment, and where the interruption rule indicates to perform the multi-slot communication over the one or more symbols.

Aspect 58: The method of Aspect 57, further comprising resuming the multi-slot communication in the one or more symbols with data that was to be transmitted in the impacted segment.

Aspect 59: The method of Aspect 57, where the multi-slot communication is resumed in the one or more symbols omitting data that was to be transmitted in the impacted segment.

Aspect 60: The method of any of Aspects 32-59, further comprising determining, based on a capability of the UE or a configuration of the multi-slot transmission occasion, at least one of: whether to cancel the transmission on the remainder of the impacted segment, or whether, in the remainder of the impacted segment, the multi-slot communication is to be resumed with data that was to be transmitted in the impacted segment or omitting data that was to be transmitted in the impacted segment.

Aspect 61: The method of Aspect 60, where the configuration of the multi-slot transmission occasion indicates how interleaving and rate matching are handled across slot boundaries.

Aspect 62: An apparatus for wireless communication at a device, comprising a processor; memory coupled with the processor; and instructions stored in the memory and executable by the processor to cause the apparatus to perform the method of one or more of Aspects 1-61.

Aspect 63: A device for wireless communication, comprising a memory and one or more processors coupled to the memory, the memory and the one or more processors configured to perform the method of one or more of Aspects 1-61.

Aspect 64: An apparatus for wireless communication, comprising at least one means for performing the method of one or more of Aspects 1-61.

Aspect 65: A non-transitory computer-readable medium storing code for wireless communication, the code comprising instructions executable by a processor to perform the method of one or more of Aspects 1-61.

Aspect 66: A non-transitory computer-readable medium storing a set of instructions for wireless communication, the set of instructions comprising one or more instructions that, when executed by one or more processors of a device, cause the device to perform the method of one or more of Aspects 1-61.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A apparatus for wireless communication, comprising:
a memory; and
one or more processors communicatively coupled to the memory, wherein the one or more processors are configured to:
receive an indication of a multi-slot transmission occasion comprising a plurality of sets of contiguous time domain resources corresponding to a plurality of segments, wherein:
the plurality of segments comprises a first segment and a second segment,
the first segment comprises a first set of uplink slots,
the second segment comprises a second set of uplink slots,
the first segment is separated from the second segment by a set of downlink slots, and the plurality of segments are associated with a same redundancy version index of a multi-slot communication;

identify an interruption of the multi-slot communication associated with the second segment; and transmit at least a portion of the multi-slot communication on the multi-slot transmission occasion based on at least one of:
 prioritization on the second segment,
 a bandwidth part (BWP) switch associated with the interruption,
 one or more segments, of the plurality of segments, that occur after the second segment, or
 a remainder of the second segment.

2. The apparatus of claim 1, wherein transmission of at least the portion of the multi-slot communication on the multi-slot transmission occasion is based on an interruption rule.

3. The apparatus of claim 1, wherein the one or more processors are configured to:
 transmit an interrupting communication during the second segment; and
 cancel a second portion of the multi-slot communication in interrupted resources of the second segment.

4. The apparatus of claim 3, wherein the multi-slot communication is scheduled via a configured grant.

5. The apparatus of claim 3, wherein the interrupting communication associated with the interruption is associated with a higher priority than a priority with which the multi-slot communication is associated.

6. The apparatus of claim 3, wherein the interrupting communication associated with the interruption is scheduled by a dynamic grant.

7. The apparatus of claim 1, wherein the one or more processors, to identify the interruption, are configured to identify the interruption based on an instance of a physical uplink control channel overlapping with the second segment.

8. The apparatus of claim 1, wherein the one or more processors, to identify the interruption, are configured to identify the interruption based on a single slot physical uplink shared channel overlapping with the second segment.

9. The apparatus of claim 1, wherein the one or more processors, to identify the interruption, are configured to identify the interruption based on an uplink cancellation indicator that cancels at least a second portion of the multi-slot communication on the second segment, and wherein the one or more processors, to transmit at least the portion of the communication on the multi-slot transmission occasion, are configured to transmit the multi-slot communication based on canceling at least the second portion of the multi-slot communication on the second segment.

10. The apparatus of claim 1, wherein the one or more processors, to identify the interruption, are configured to identify the interruption based on a downlink control information (DCI) based BWP switch indication that indicates to switch to an updated uplink bandwidth part prior to completion of the multi-slot communication.

11. The apparatus of claim 10, wherein the one or more processors, to transmit at least the portion of the communication, are configured to:
 transmit at least the portion of the multi-slot communication before switching to the updated uplink bandwidth part;
 switch to the updated uplink bandwidth part prior to completion of the multi-slot communication; and
 cancel a second portion of the multi-slot communication after switching to the updated uplink bandwidth part.

12. The apparatus of claim 11, wherein the one or more processors, to cancel the second portion, are configured to cancel the second portion irrespective of whether the updated uplink bandwidth part includes resources of the multi-slot transmission occasion.

13. The apparatus of claim 10, wherein the DCI based BWP switch indication indicates to switch to the updated uplink bandwidth part prior to completion of the multi-slot communication based on a processing timeline associated with the apparatus.

14. The apparatus of claim 1, wherein the one or more processors are further configured to cancel transmission on the one or more segments that occur after the second segment.

15. The apparatus of claim 1, wherein the one or more processors are further configured to cancel transmission on the second segment, wherein transmission on one or more segments of the plurality of segments that occur after the second segment is not cancelled.

16. The apparatus of claim 15, wherein the one or more processors are further configured to resume the multi-slot communication, after the second segment, omitting data that was to be transmitted in the second segment.

17. The apparatus of claim 1, wherein the remainder of the second segment comprises one or more symbols after an impacted portion of the second segment, and wherein the one or more processors are configured to cancel transmission over the one or more symbols.

18. The apparatus of claim 1, wherein the multi-slot communication is a multi-slot physical uplink shared channel transmission.

19. A network entity for wireless communication, comprising:
 a memory; and
 one or more processors communicatively coupled to the memory, wherein the one or more processors are configured to:
  transmit, to an apparatus, an indication of a multi-slot transmission occasion comprising a plurality of sets of contiguous time domain resources corresponding to a plurality of segments, wherein:
   the plurality of segments comprises a first segment and a second segment,
   the first segment comprises a first set of uplink slots,
   the second segment comprises a second set of uplink slots,
   the first segment is separated from the second segment by a set of downlink slots, and
   the plurality of segments are associated with a same redundancy version index of a multi-slot communication;
  identify an interruption of the multi-slot communication associated with the second segment; and
  receive at least a portion of the multi-slot communication on the multi-slot transmission occasion in accordance with an interruption rule that indicates how to handle at least one of:
   prioritization on the second segment,
   a bandwidth part (BWP) switch associated with the interruption,
   one or more segments, of the plurality of segments, that occur after the second segment, or
   a remainder of the second segment.

20. The network entity of claim 19, wherein the interruption rule indicates to transmit an interrupting communication during the second segment and to cancel a second portion of the multi-slot communication in interrupted resources of the second segment.

21. The network entity of claim 19, wherein, to identify the interruption, the one or more processors are configured to identify the interruption based on a single slot physical uplink shared channel overlapping with the second segment.

22. The network entity of claim 19, wherein, if the multi-slot communication is scheduled via a configured grant, the interruption rule indicates to transmit an interrupting communication during the second segment and to cancel a second portion of the multi-slot communication in interrupted resources of the second segment.

23. The network entity of claim 19, wherein the one or more processors, to identify the interruption, are configured to identify the interruption based on an instance of a physical uplink control channel overlapping with the second segment.

24. The network entity of claim 19, wherein, if an interrupting communication associated with the interruption is scheduled by a dynamic grant, the interruption rule indicates to transmit the interrupting communication during the second segment and to cancel a second portion of the multi-slot communication in interrupted resources of the second segment.

25. The network entity of claim 24, wherein the multi-slot communication is scheduled by a configured grant.

26. A method of wireless communication performed by an apparatus, comprising:
receiving an indication of a multi-slot transmission occasion comprising a plurality of sets of contiguous time domain resources corresponding to a plurality of segments, wherein:
the plurality of segments comprises a first segment and a second segment,
the first segment comprises a first set of uplink slots,
the second segment comprises a second set of uplink slots,
the first segment is separated from the second segment by a set of downlink slots, and
the plurality of segments are associated with a same redundancy version index of a multi-slot communication;
identifying an interruption of the multi-slot communication associated with the second segment; and
transmitting at least a portion of the multi-slot communication on the multi-slot transmission occasion based on at least one of:
prioritization on the second segment,
a bandwidth part (BWP) switch associated with the interruption,
one or more segments, of the plurality of segments, that occur after the second segment, or
a remainder of the second segment.

27. The method of claim 26, wherein transmitting at least the portion of the multi-slot communication on the multi-slot transmission occasion is based on an interruption rule.

28. The method of claim 26, further comprising:
transmitting an interrupting communication during the second segment; and
cancelling a second portion of the multi-slot communication in interrupted resources of the second segment.

29. A method of wireless communication performed by a network entity, comprising:
transmitting, to an apparatus, an indication of a multi-slot transmission occasion comprising a plurality of sets of contiguous time domain resources corresponding to a plurality of segments, wherein:
the plurality of segments comprises a first segment and a second segment,
the first segment comprises a first set of uplink slots,
the second segment comprises a second set of uplink slots,
the first segment is separated from the second segment by a set of downlink slots, and
the plurality of segments are associated with a same redundancy version index of a multi-slot communication;
identifying an interruption of the multi-slot communication associated with the second segment; and
receiving at least a portion of the multi-slot communication on the multi-slot transmission occasion in accordance with an interruption rule that indicates how to handle at least one of:
prioritization on the second segment,
a bandwidth part (BWP) switch associated with the interruption,
one or more segments, of the plurality of segments, that occur after the second segment, or
a remainder of the impacted second segment.

30. The method of claim 29, wherein the interruption rule indicates to transmit an interrupting communication during the second segment and to cancel a second portion of the multi-slot communication in interrupted resources of the second segment.

* * * * *